(12) United States Patent
Yamanaka et al.

(10) Patent No.: US 7,567,019 B2
(45) Date of Patent: Jul. 28, 2009

(54) ACTUATOR SYSTEM

(75) Inventors: Kiyoko Yamanaka, Kokubunji (JP); Yasushi Goto, Kokubunji (JP); Takehiko Hasebe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 11/907,057

(22) Filed: Oct. 9, 2007

(65) Prior Publication Data

US 2008/0088208 A1    Apr. 17, 2008

(30) Foreign Application Priority Data

Oct. 11, 2006    (JP) .............................. 2006-277559

(51) Int. Cl.
*H01L 41/08* (2006.01)

(52) U.S. Cl. ..................................... 310/328

(58) Field of Classification Search ................ 310/328, 310/365, 311, 317, 323, 369; 369/126, 53; *H01L 41/08*
See application file for complete search history.

(56) References Cited

U.S. PATENT DOCUMENTS 5,526,334 A * 6/1996 Yamano et al. ............. 369/126

6,459,088 B1 * 10/2002 Yasuda et al. ............... 310/328

FOREIGN PATENT DOCUMENTS

JP    2000-253683    3/1999

OTHER PUBLICATIONS

P. Vettiger et al., "The 'Millipede'—Nanotechnology Entering Data Storage", IEEE Transactions on Nanotechnology, vol. 1, No. 1, Mar. 2002, pp. 39-55.

* cited by examiner

*Primary Examiner*—Quyen Leung
*Assistant Examiner*—Karen B Addison
(74) *Attorney, Agent, or Firm*—Reed Smith LLP; Juan Carlos A. Marquez, Esq.

(57) ABSTRACT

An actuator using a piezoelectric element is stably operated at high speed. The actuator includes driving units provided to face a carrier stage and moving the carrier stage in an X-axis direction, piezoelectric elements provided to the driving units respectively and expanding and contracting in the X-axis direction, a carrier electrode provided on a surface of the carrier stage on a driving-unit side, and driving electrodes provided on surfaces of the driving units on a carrier stage side and electrostatically adsorbing the carrier electrode. Signals not synchronized with each other are applied to the piezoelectric elements.

8 Claims, 20 Drawing Sheets

| RECORDING SURFACE DENSITY | 1Tb/inch$^2$ |
| --- | --- |
| RECORDING DOT DIAMETER | 10nmΦ |
| PROBE HEAD DIAMETER | 10nmΦ |
| RECORDING DOT PITCH | 25nm |

FIG. 26

| | SCRATCH TYPE | IMPACT TYPE | PIEZOELECTRIC DRIVING-ELECTROSTATIC ADSORPTION TYPE |
|---|---|---|---|
| STEP ACCURACY | CORRESPONDS TO A DEFORMATION AMOUNT OF A MOVING ELEMENT | CORRESPONDS TO A DEFORMATION AMOUNT OF A PIEZOELECTRIC ELEMENT | CORRESPONDS TO A DEFORMATION AMOUNT OF A PIEZOELECTRIC ELEMENT |
| DRIVING-CONTROL FORCE | FRICTION FORCE | A PIEZOELECTRIC ELEMENT, FRICTION FORCE | A PIEZOELECTRIC ELEMENT, FRICTION FORCE, ELECTROSTATIC FORCE |
| PRINCIPLE | UTILIZING FRICTION FORCE BETWEEN A DEFORMATION MODE OF A MOVING ELEMENT AND A MOVING SURFACE | UTILIZING A RAPID DEFORMATION OF A PIEZOELECTRIC ELEMENT AND FRICTION FORCE BETWEEN A MOVING SURFACE AND A MOVING ELEMENT | IN ADDITION TO UTILIZING A RAPID DEFORMATION OF A PIEZOELECTRIC ELEMENT AND FRICTION FORCE BETWEEN A MOVING SURFACE AND A MOVING ELEMENT, CONTROLLING ADSORBABILITY WITH A MOVING SURFACE ACTIVELY WITH ELECTROSTATIC FORCE |

ACTUATOR SYSTEM

CROSS-REFERENCE TO RELATED APPLICATION

The present application claims priority from Japanese Patent Application No. JP 2006-277559 filed on Oct. 11, 2006, the content of which is hereby incorporated by reference into this application.

TECHNICAL FIELD OF THE INVENTION

The present invention relates to an actuator system and, in particular, to a technology effective when applied to an actuator system using a piezoelectric element.

BACKGROUND OF THE INVENTION

A probe memory technology using a principle of a Scanning Probe Microscope (SPM) is a promising technology for an information recording device dramatically increasing recording density. An information storage device using such a probe memory technology (hereinafter referred to as a probe memory) includes a recording medium, an actuator system driving the recording medium mounted over a stage (substrate) in X-axis and Y-axis directions (biaxial directions), a probe including one or more microprobes (hereinafter referred to as a probe chip) for executing information writing to or information reading from the recording medium, and a signal processing unit processing this information as appropriate to output desired data.

A technology regarding an electrostatic clamping mechanism having a pair of clamp electrodes and an inchworm mechanism based on the electrostatic clamping mechanism is disclosed in Japanese Patent Application Laid-Open Publication No. 2000-253683 (Patent Document 1). In this electrostatic clamping mechanism, a voltage is applied between the clamp electrodes to cause electrostatic attracting force between the clamp electrodes.

And, a technology in which probes are manufactured in a two-dimensional array shape, and the respective probes are used in parallel as recording terminals is disclosed in P. Vettiger et al. "IEEE Transaction on Nanotechnology (2002)", pp. 39-55 (Non-Patent Document 1). In this probe memory, a media-mounting stage of an electromagnetic driving scheme is employed.

SUMMARY OF THE INVENTION

In a probe memory, a probe chip is placed so as to be close to or make contact with a desired position of a recording medium and changes in various physical amount in the recording medium is detected with a spatial resolution at atom-molecule level, thereby executing information reading or writing. And therefore, when a flat-shaped recording medium is assumed, an X-Y actuator system with high accuracy capable of at least driving the recording medium in biaxial directions, that is, X-Y axes directions is required.

FIG. 25 is a table showing standard performance of each element (recording dot diameter, probe head diameter, and recording dot pitch) forming a probe memory required for achieving a recording surface density of a recording medium of 1 Tb/inch$^2$ or higher. From this table, it is evident that, to achieve a probe memory with 1 Tb/inch$^2$ or higher, data is written or read at least with a pitch of 25 nm. And therefore, a multi-axial-movement-type actuator system having a recording medium mounted thereon in which operation of 25 nm is performed at one or a plurality of steps to achieve accurate positioning is required.

And therefore, the electromagnetic driving scheme, such as the one disclosed in the Non-Patent Document 1, for example, is not suitable in principle to accurately control the amount of movement of the media-mounting stage per one step, and is not suitable for a probe memory that requires operation of a pitch of 25 nm per one step. And, in the electromagnetic driving scheme, a servo control mechanism has to be provided to stop the operation of the media-mounting stage for each step, thereby increasing the time per one step by the servo mechanism. For this reason, the electromagnetic driving scheme is not suitable for high-speed operation.

Representative schemes known as a micro-actuator system with a high positioning accuracy are shown in a table in FIG. 26. The schemes include a scratch type in which friction force of a contact surface is used as driving force, an impact type in which a rapid deformation of a piezoelectric element and friction force of a contact surface are used, and a piezoelectric driving-electrostatic adsorption type in which, in addition to the impact type, adsorptive force of the contact surface is actively controlled with electrostatic force.

In the case where the probe memory with a recording surface density of 1 Tb/inch$^2$ or higher is considered as an information recording device for an information terminal, mainly a mobile device, the device is basically not used in a spatially-stationary installation state (horizontal state) but is carried in a user's arbitrary direction. And therefore, to allow a stable operation canceling gravity in any direction, the piezoelectric driving-electrostatic adsorption type, in which adsorption control of the driving unit is actively performed, is desirable as a driving control scheme.

And, in the piezoelectric driving-electrostatic adsorption type, in which a rapid deformation of a piezoelectric element and friction force of the contact surface are used, an amount of deformation of the piezoelectric element for one time corresponds to one step of movement of a moving element. Deformation of the piezoelectric element is caused due to the ratio of crystalline distortion. In principle, as the dimension of the piezoelectric element is decreased, an amount of crystalline distortion is also decreased. If the probe memory is downsized, the piezoelectric element is also downsized, and as a result, a multi-axial-movement-type actuator system having a recording medium with a small amount of movement for one step mounted thereon can be achieved. Accordingly, for an information storage device for an information terminal, mainly a mobile device, downsizing, high density (large capacity), and low voltage are required, and therefore the piezoelectric driving-electrostatic adsorption type is advantageous.

Thus, the present inventors have studied actuator systems of the piezoelectric driving-electrostatic adsorption type (hereinafter referred to as actuators). FIG. 27 is a cross-sectional diagram of a configuration of an actuator 101 studied by the present inventors. Note that, in FIG. 27, for ease of description, a carrier stage 111 is shown as being separated from a driving unit 112 and a holding unit 113. In practice, however, the carrier stage 111 is provided so as to make contact with the driving unit 112 and the holding unit 113.

As shown in FIG. 27, the actuator 101 studied by the present inventors includes the carrier stage 111, the driving unit 112 provided to face the carrier stage 111 and moving the carrier stage 111 in an X-axis direction, and the holding unit 113 provided to face the carrier stage 111 and holding the carrier stage 111.

The carrier stage 111 includes a carrier electrode 115 provided on a surface of the carrier stage 111 on a driving unit 112 side. And, the driving unit 112 includes a driving stage 116 as a base material (substrate), and further includes a piezoelectric element 117 provided to the driving stage 116 and extending and contracting in the X-axis direction and a driving electrode 118 provided on a surface of the driving stage 116 on a carrier stage 111 side and electrostatically adsorbing the carrier electrode 115. And, the holding unit 113 includes a base frame 120 fixed as a base material, and further includes a holding electrode 121 provided on a surface of the base frame 120 on a carrier stage 111 side and electrostatically adsorbing the carrier electrode 115. Note that, the piezoelectric element 117 having its end provided to the driving stage 116 has the other end fixed to the base frame 120.

With an insulating film not shown being provided on a surface of the carrier electrode 115 on a driving electrode 118 side, the driving electrode 118 and the holding electrode 121 are electrically insulated from the carrier electrode 115. Thus, with electrostatic force at the time of providing a potential difference between the electrodes, adsorption holdings between the carrier stage 111 (carrier electrode 115) and the driving stage 116 (driving electrode 118) and between the carrier stage 111 (carrier electrode 115) and the base frame 120 (holding electrode 121) are controlled. Furthermore, the driving stage 116 having the driving electrode 118 mounted thereon can move and is connected and fixed to the piezoelectric element 117, which is a source of generating driving force (driving source), thereby transmitting a subtle electrostriction displacement of the piezoelectric element 117 to the driving stage 116.

Next, a procedure of operation of the actuator studied by the present inventors is described using control signals of FIGS. 28A and 29B. FIGS. 28A and 29B are explanation diagrams showing control signals for the actuator of FIG. 27. FIG. 28A shows control signals for the driving system, whilst FIG. 28B shows control signals for the carrying system.

A reference symbol Vp in FIG. 28A denotes a signal for causing the piezoelectric element 117 to extend and contract, a reference symbol Vd denotes a control signal applied to the driving electrode 118, and a reference symbol Vh denotes a control signal applied to the holding electrode 121. And, a reference symbol Vs in FIG. 28B denotes a control signal applied to the carrier electrode 115. The carrier stage 111 has three types of operation mode, that is, Forward mode (forward operation), Back mode (backward operation), and Stop mode (stop operation). As shown in FIG. 28B, corresponding to the operation mode, the timing chart of the control signal Vs applied to the carrier electrode 115 is different.

Here, the Forward mode of the actuator 101 is described. It is assumed that, in an initial stationary state, signals applied to all electrodes are zero (0V).

First, in STEP 1 which is a start of the operation of the actuator 101, LOW is applied to the carrier electrode 115, whilst HIGH is applied to the driving electrode 118, thereby providing a potential difference between the carrier electrode 115 and the driving electrode 118 to adsorb with electrostatic force.

Next, in STEP 2, a voltage is applied to the piezoelectric element 117. With the electrostriction of the piezoelectric element 117, the driving stage 116 (driving electrode 118) is moved. At this time, since the carrier electrode 115 is adsorbed to the driving electrode 118, the carrier stage 111 moves in a forward direction by an amount of electrostriction displacement of the piezoelectric element.

Next, in STEP 3, LOW is applied to the driving electrode 118 to release adsorption of the carrier electrode 115 and the driving electrode 118. At the same time, HIGH is applied to the holding electrode 121 to newly adsorb the carrier electrode 115 and the holding electrode 121 with electrostatic force.

Next, in STEP 4, the voltage applied to the piezoelectric element 117 is decreased to make the electrostriction of the piezoelectric element 117 to be zero. At this time, the carrier stage 111 is still adsorbed to the holing electrode 121. Thus, even after size of the piezoelectric element 117 is returned to normal, the carrier electrode 115 is fixed to the holding electrode 121, and therefore the carrier stage 111 is held at the position after movement in STEP 2.

STEP 1 to STEP 4 described above are one-cycle operation of the actuator 101 studied by the present inventors. Although the piezoelectric element 117 and the driving electrode 118 return to an initial position in STEP 1 after one cycle, the carrier stage 111 moves in the forward direction by the amount of electrostriction of the piezoelectric element 117 after one cycle. By repeating this cycle, the carrier stage 111 successively moves in a step manner in the forward direction.

And, the Stop mode in which the carrier stage 111 becomes stationary and the Back mode can be achieved by changing only the signal applied to the carrier electrode 115 as shown in FIG. 28B, without changing the control signal for the driving system shown in FIG. 28A.

As described above, the actuator 101 studied by the present inventors has a feature that the operation mode can be controlled by only the signal applied to the carrier electrode 115, that is, the control signal for the carrier system, without changing the signals of the driving electrode 118, the holding electrode 121 and the like, that is, the control signals for the driving system.

And, in principle, an amount of movement of the carrier stage 111 for one cycle corresponds to the amount of electrostriction of the piezoelectric element 117. And therefore, as the dimension of the piezoelectric element 117 is decreased, the amount of movement for one cycle is decreased. That is, the actuator 101 studied by the present inventors employs an actuator control scheme achieving both microfabrication and precise operation of the system.

However, a device such as an information recording device (a probe memory) for an information terminal, mainly a mobile device, for example, is basically not used in a spatially-stationary installation state (horizontal state) but is carried in a user's arbitrary direction. In the actuator 101 studied by the present inventors, the driving unit 112 is merely provided to have one piezoelectric element 117 and one driving electrode 118, and therefore a stable operation may not be achieved.

Moreover, for example, if positional relation among the holding electrode 121, the carrier electrode 115 and the like shown in FIG. 27 is assumed to be an initial position, due to the operation of the driving unit 112, the carrier stage 111 may move from the initial position to either one holding electrode 121 side with respect to the forwarding direction (X-axis direction) of the carrier stage 111, thereby significantly being shifted from the initial position. In this case, an area where the other holding electrode 121 and the carrier electrode 115 are overlapped each other is decreased, thereby decreasing electrostatic force between the holding electrode 121 and the carrier electrode 115. For this reason, the actuator may not be able to ensure enough electrostatic force between the holding electrode 121 and the carrier electrode 115 to cause the carrier stage 111 to make a step movement. And therefore, if the carrier stage 111 is significantly shifted from the initial position even once, the electrostatic force between the holding electrode 121 and the carrier electrode 115 becomes weak or zero. Thus, in some cases, it may not be possible to cause the carrier stage 111 to be drawn back, for example, to the initial position.

Still further, as explained using FIGS. 28A and 28B, the procedure cannot go to the next operation unless the operation from STEP 1 to STEP 4 for one cycle is finished. That is, the one cycle of the operation of the actuator 101 includes a time during which the carrier electrode 115 is held by the holding electrode 121, specifically, a time during which the carrier stage 111 is relatively stationary in STEP 4. And therefore, if an amount of movement of the carrier stage 111 for one cycle is small, the time of movement of the carrier stage 111 may be long.

An object of the present invention is to provide a technology capable of stably operating an actuator using a piezoelectric element.

Another object of the present invention is to provide a technology capable of operating an actuator using a piezoelectric element at high speed.

The above and other objects and novel characteristics of the present invention will be apparent from the description of this specification and the accompanying drawings.

The typical ones of the invention disclosed in this application will be briefly described as follows.

An actuator according to the present invention includes a substrate moving in biaxial directions, a driving unit provided to face the substrate and moving the substrate in one of the two axial directions, a piezoelectric element provided to the driving unit and expanding and contracting in one direction of the biaxial directions, a first electrode provided on a surface of the substrate on a driving unit side, and a second electrode provided on a surface of the driving unit on a substrate side and electrostatically adsorbing the first electrode and a plurality of the driving units are provided in the one axial direction.

The effects obtained by typical aspects of the present invention will be briefly described below.

According to the present invention, the actuator using the piezoelectric element can be stably operated. And, the actuator using the piezoelectric element can be operated at high speed.

BRIEF DESCRIPTIONS OF THE DRAWINGS

FIG. 26 is a table showing schemes of a micro-actuator system with high positioning accuracy;

DESCRIPTIONS OF THE PREFERRED EMBODIMENTS

Hereinafter, embodiments of the present invention will be described in detail with reference to the accompanying drawings. Note that the same components are denoted by the same reference symbols throughout the drawings for describing the embodiment, and the repetitive description thereof will be omitted.

First Embodiment

Figure 1:
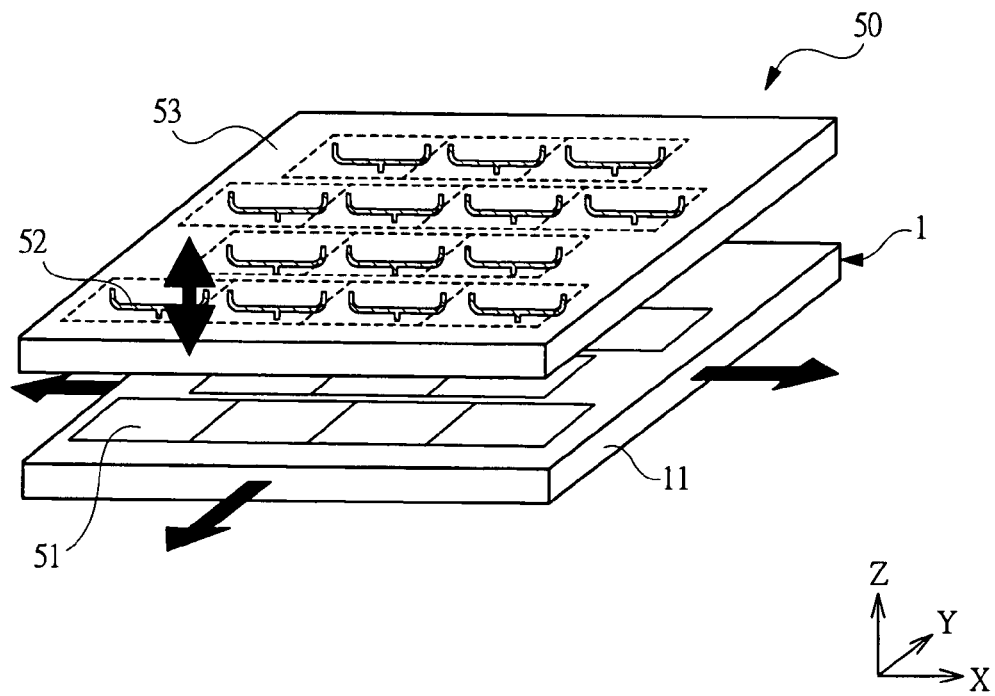
FIG. 1 is a perspective diagram schematically showing a main part of a memory probe including an actuator according to a first embodiment of the present invention.
Figure 2:
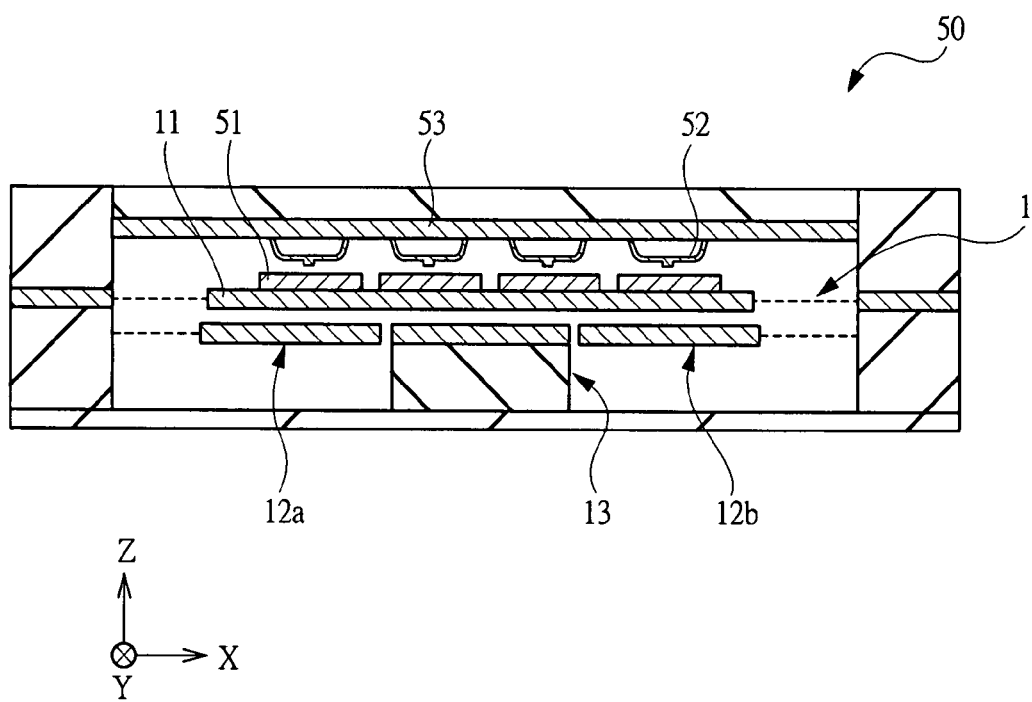
FIG. 2 is a cross-sectional diagram schematically showing the main part of the memory probe including the actuator according to the first embodiment of the present invention.

First, a configuration of a probe memory including an actuator system of piezoelectric driving-electrostatic adsorption type (hereinafter referred to as an actuator) according to a first embodiment of the present invention is described using FIGS. 1 and 2. FIG. 1 is a perspective diagram of a probe memory 50 including an actuator 1 according to the first embodiment. FIG. 2 is a cross-sectional diagram of the probe memory 50 of FIG. 1 sectioned at a center position. Note that, in FIG. 2, for ease of description, a carrier stage 11 is shown as being separated from driving units 12a, 12b and a holding unit 13. In practice, however, the carrier stage 11 is provided so as to make contact with the driving units 12a, 12b and the holding unit 13.

The probe memory 50 is provided with a plurality of probes 52 including one or more small probes (probe chips) for performing information writing to or information reading from a recording medium 51, a first substrate 53 having a signal processing unit that processes the information appropriately to output desired data, and the actuator 1 moving the recording medium 51 in X-Y axes directions (biaxial directions).

This actuator 1 includes the carrier stage 11 which is a second substrate moving in the X-Y axes directions, the first driving unit 12a and the second driving unit 12b provided to face the carrier stage 11 and moving the carrier stage 11 in, for example, X-axis direction shown in FIG. 2 of the X-Y axes directions shown in FIG. 1, and the holding unit 13 provided to face the carrier stage 11 and holding the carrier stage 11, and is a mechanism that drives the carrier stage 11 having the recording medium 51 mounted thereon in the X-Y axes directions. The first driving unit 12a, the second driving unit 12b and the holding unit 13 are provided in an arrangement in which the driving units 12a, 12b are provided on both sides of the holding unit 13 in the X-axis direction. Here, dotted lines in FIG. 2 represent that the carrier stage 11 and the driving units 12a, 12b move in the X-axis direction.

The probe memory 50 moves the probe chips of the probes 52 in a Z-axis direction to be close to or make contact with a desired position of the recording medium 51, and detects various physical mounts with a spatial resolution at atom-molecule level, thereby executing information reading or writing.

Figure 3:
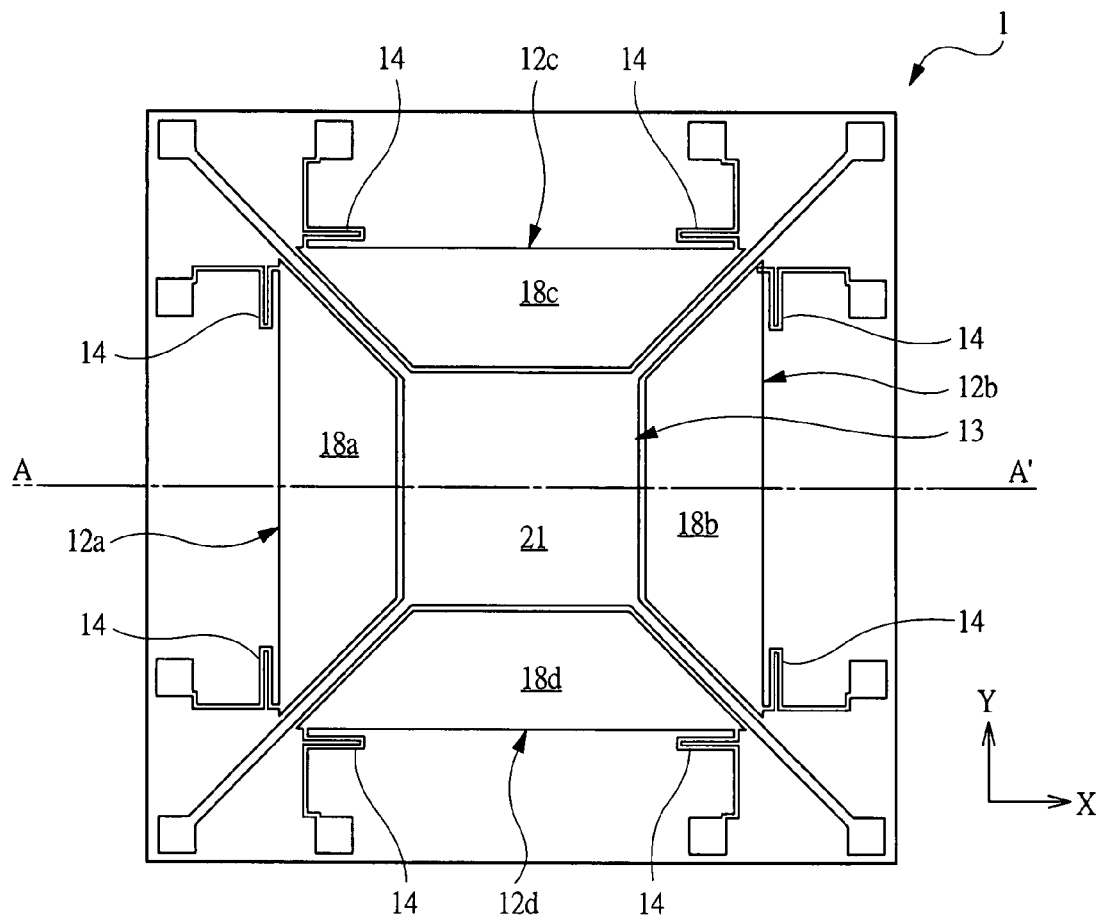
FIG. 3 is a plane diagram schematically showing the main part of the actuator according to the first embodiment of the present invention.
Figure 4:
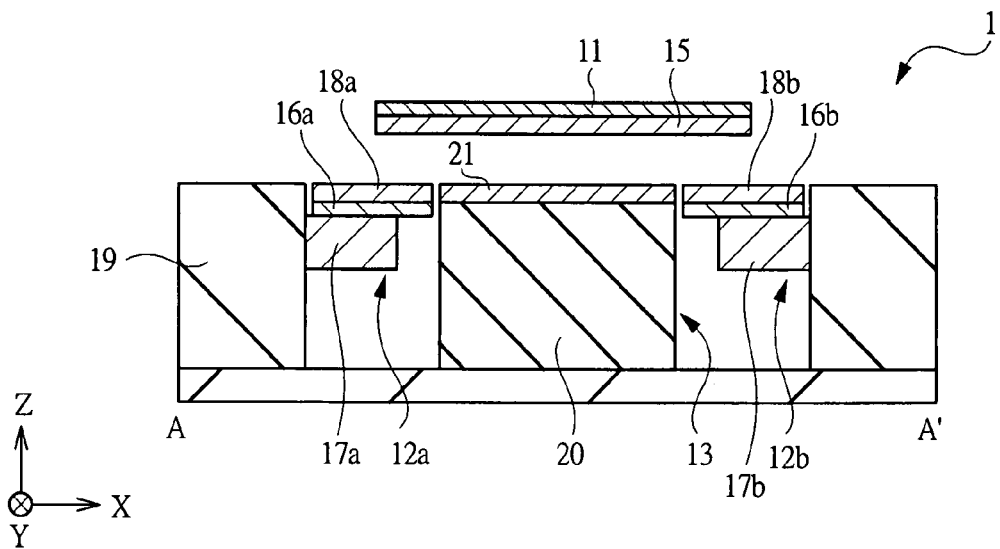
FIG. 4 is a cross-sectional diagram along an A-A' line of FIG. 3.

FIG. 3 is a plan diagram of the actuator 1 according to the first embodiment. FIG. 4 is a cross-sectional diagram along an A-A' line in FIG. 3. Note that, in FIG. 3, although the carrier stage 11 is omitted, the carrier stage 11 has a rectangular shape in a plan-view shape of X-Y plane, as shown in FIG. 1. And, in FIG. 4, for ease of description, the carrier stage 11 is shown as being separated from the driving units 12a, 12b and the holding unit 13. In practice, however, the carrier stage 11 is provided so as to make contact with the driving units 12a, 12b and the holding unit 13.

As shown in FIG. 3, the actuator 1 is provided with, at its center area, the first driving unit 12a having a first driving electrode 18a, the second driving unit 12b having a second driving electrode 18b, a third driving unit 12c having a third driving electrode 18c, a fourth driving unit 12d having a fourth driving electrode 18d, and the holding unit 13 having a holding electrode 21. The sides of the holding unit 13 having a rectangular shape in a plan-view shape are provided with the driving units 12a, 12b, 12c, and 12d, respectively. That is, the driving unit 12a and the driving unit 12b are provided so as to face each other in the X-axis direction across the holding unit 13, whilst the driving unit 12c and the driving unit 12c are provided so as to face each other in the Y-axis direction across the holding unit 13.

These driving units 12a to 12d are connected to an elastic unit 14. This elastic unit 14 extends and contracts so as to allow the driving units 12a to 12d to move. And therefore, the driving units 12a, 12b move in the X-axis direction, whilst the driving units 12c, 12d move in the Y-axis direction.

Note that, an effective area of the carrier stage 11 is set to be within a range not exceeding outer perimeter edges of the driving units 12a to 12d, and a maximum movement range of the carrier stage 11 in the actuator 1 is preferably within the range not exceeding the outer perimeter edges of the driving units 12a to 12d.

As shown in FIG. 4, the actuator 1 includes the carrier stage 11 composed of a substrate moving in biaxial directions (X-Y axes directions), the first driving unit 12a and the second driving unit 12b provided to face the carrier stage 11 and moving the carrier stage 11 in uniaxial direction (the X-axis direction), and the holding unit 13 provided to face the carrier stage 11 and holding the carrier stage 11, and is a mechanism that drives the carrier stage 11 having the recording medium 51 mounted thereon in the biaxial directions. The first driving unit 12a, the second driving unit 12b and the holding unit 13 are provided in an arrangement in which the driving units 12a, 12b are provided on both sides of the holding unit 13 in the X-axis direction.

And, the carrier stage 11 has a carrier electrode 15 provided on a surface of the carrier stage 11 on a driving units 12a, 12b side. Furthermore, the driving units 12a, 12b include driving stages 16a, 16b, respectively, as base materials (third substrate), and further include piezoelectric elements 17a, 17b provided on lower surfaces of the driving stages 16a, 16b respectively and extending and contracting in the X-axis direction and driving electrodes 18a, 18b provided on surfaces of the driving stages 16a, 16b on a carrier stage 11 side respectively and electrostatically adsorbing the carrier electrode 15. These piezoelectric elements 17a, 17b are fixed to a supporting frame 19. And, the holding unit 13 includes a base frame 20 fixed to the supporting frame 19 as a base material, and also includes the holding electrode 21 provided on a surface of the base frame 20 on a carrier stage 11 side and electrostatically adsorbing the carrier electrode 15.

And, with an insulating film not shown being provided on a surface of the carrier electrode 15 on a driving electrodes 18a, 18b side, the driving electrodes 18a, 18b and the holding electrode 21 are electrically insulated from the carrier electrode 15.

Note that, in FIG. 4, the driving units 12a, 12b and the holding unit 13 of FIG. 3 in the X-axis direction are shown, and the same goes for the driving units 12c, 12d and the holding unit 13 of FIG. 3 in the Y-axis direction.

As described above, in the actuator 1 according to the first embodiment, the plurality of driving units 12a, 12b are provided in the X-axis direction (one axial direction of the biaxial directions), and the plurality of the driving units 12c, 12d are provided in the Y-axis direction (the other one axial direction of the biaxial directions). And therefore, with the plurality of driving units (for example, the first driving unit 12a and the second driving unit 12b) being provided in uniaxial direction (for example, the X-axis direction), the actuator 1 can be stably operated. Furthermore, the driving units 12a, 12b are provided on both sides of the holding unit 13 in the X-axis direction, whilst the driving units 12c, 12d are provided on both sides of the holding unit 13 in the Y-axis direction. With this, the actuator 1 can be more stably operated. The stable operation of this actuator 1 is described below using FIGS. 5A to 6B.

First, a method of moving the carrier stage 11 in the X-axis direction in the actuator 1 according to the first embodiment is described.

Figure 5A:
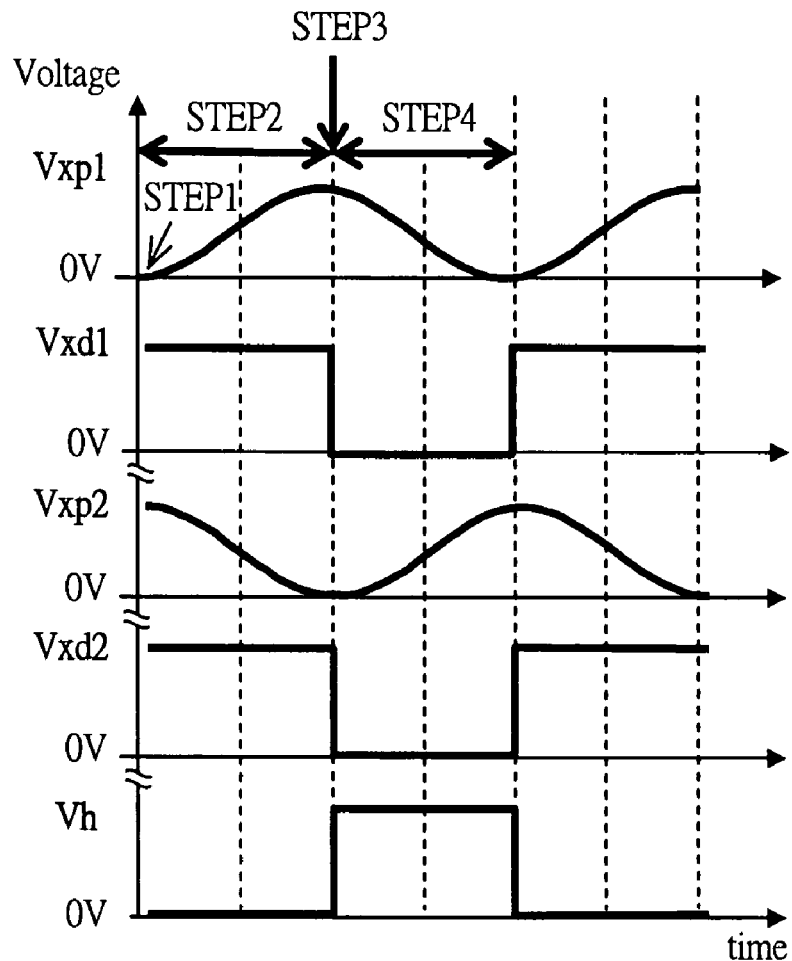
FIG. 5A is a timing chart of control signals for a driving system for moving a carrier stage in an X-axis direction in the actuator according to the first embodiment of the present invention.
Figure 5B:
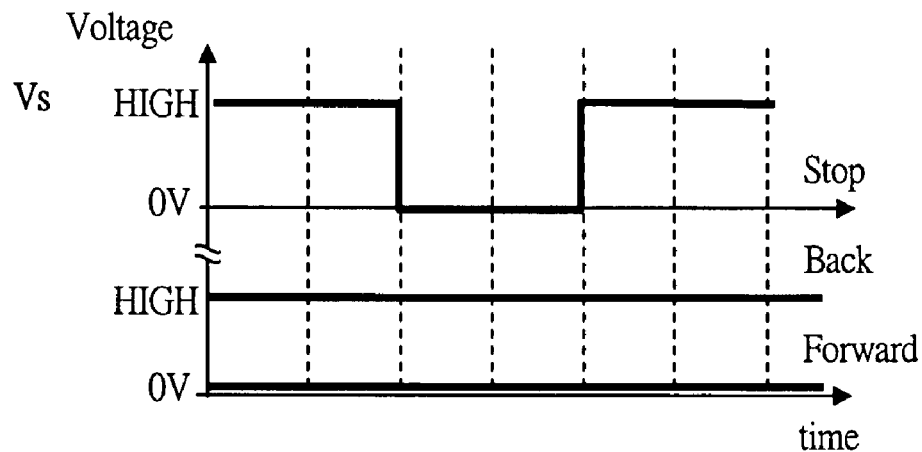
FIG. 5B is a timing chart of a control signal for a carrying system for moving the carrier stage in an X-axis direction in the actuator according to the first embodiment of the present invention.

FIGS. 5A and 5B are timing charts of control signals of the actuator 1 driving the carrier stage 11 in the X-axis direction. FIG. 5A shows control signals for a driving system, whilst FIG. 5B shows a control signal for a carrying system.

A reference symbol Vxp1 in FIG. 5A denotes a signal causing the first piezoelectric element 17a to extend and contract, a reference symbol Vxd1 denotes a control signal applied to the first driving electrode 18a, a reference symbol Vxp2 denotes a signal causing the second piezoelectric element 17b to extend and contract, and a reference symbol Vxd2 denotes a control signal applied to the second driving electrode 18b. A reference symbol Vs in FIG. 5B denotes a control signal applied to the carrier electrode 15. The carrier stage 11 has three types of operation mode, that is, Forward mode (forward operation), Back mode (backward operation), and Stop mode (stop operation). Corresponding to the operation mode of the carrier stage 11, the timing chart of the control signal Vs applied to the carrier electrode 15 is different.

Here, the Forward mode of the actuator 1 in the X-axis direction is described. It is assumed that, in an initial stationary state, signals applied to all electrodes are zero (0V).

First, in STEP 1 which is a start of the operation of the actuator 1, LOW is inputted to the control signal Vs applied to the carrier stage 11, HIGH is inputted to the signal Vxd1 applied to the first driving electrode 18a, and HIGH is inputted to the signal Vxd2 applied to the second driving electrode 18b, thereby providing a potential difference between the carrier stage 11 and each of the driving electrodes 18a, 18b. With electrostatic force, the carrier electrode 15 (carrier stage 11) is adsorbed to the first driving electrode 18a and the second driving electrode 18b.

Next, in STEP 2, the signal Vxp1 applied to the first piezoelectric element 17a is set to be a signal that causes the piezoelectric element 17a to make a transition from a contracting state to an extending state. The signal Vxp2 applied to the second piezoelectric element 17b is set to be a signal that causes the piezoelectric element 17b to make a transition from an extending state to a contracting state. The extending or contracting operation of the first piezoelectric element 17a does not match with that of the second piezoelectric element 17b, and in the case where these two piezoelectric elements 17a and 17b are disposed in uniaxial direction (the X-axis direction), they make an extending or contracting operation in the same direction. With electrostriction of these first and second piezoelectric elements 17a, 17b, the first driving electrode 18a and the second driving electrode 18b are moved. At this time, since the carrier electrode 15 (carrier stage 11) is adsorbed to both of the first driving electrode 18a and the second driving electrode 18b, the carrier electrode 15 moves in a forward direction by an amount of electrostriction displacement of the piezoelectric elements 17a, 17b.

Next, in STEP 3, LOW is applied to the first driving electrode 18a and the second driving electrode 18b to release adsorption of the carrier electrode 15 (carrier stage 11) and the driving electrodes 18a, 18b. At the same time, HIGH is applied to the holding electrode 21 to newly adsorb the carrier electrode 15 (carrier stage 11) and the holding electrode 21 with electrostatic force.

Next, in STEP 4, the signal Vxp1 applied to the first piezoelectric element 17a is set to be a signal that causes the piezoelectric element 17a to make a transition from an extending state to a contracting state. The signal Vxp2 applied to the second piezoelectric element 17b is set to be a signal that causes the piezoelectric element 17b to make a transition from a contracting state to an extending state. The extending or contracting operation of the first piezoelectric element 17a does not match with that of the second piezoelectric element 17b, and in the case where these two piezoelectric elements 17a, 17b are disposed in uniaxial direction (the X-axis direction), they make an extending or contracting operation in the same direction. With the electrostriction of the first piezoelectric element 17a and the second piezoelectric element 17b described above, the first driving electrode 18a and the second driving electrode 18b are moved to the state in STEP 1. At this time, the carrier electrode 15 (carrier stage 11) is still adsorbed to the holding electrode 21. And therefore, even when each of the driving electrodes 18a, 18b return to the state of STEP 1, the carrier electrode 15 is still adsorbed to the holding electrode 21.

STEP 1 to STEP 4 described above are a one-cycle operation of the actuator 1 according to the first embodiment. The piezoelectric elements 17a, 17b and the driving electrodes 18a, 18b return to the initial positions in STEP 1 after one cycle respectively, but the carrier stage 11 moves in the forward direction by an amount of electrostriction of the piezoelectric elements 17a, 17b after one cycle. By repeating this cycle, the carrier stage 11 successively moves in a step manner in the X-axis direction, which is the forward direction.

And, the Stop mode in which the carrier stage 11 becomes stationary and the Back mode can be achieved by changing only the signal applied to the carrier electrode 15 as shown in FIG. 5B, without changing the control signals for the driving system shown in FIG. 5A.

Next, a method of moving the carrier stage 11 in the Y-axis direction in the actuator 1 according to the first embodiment is described.

Figure 6A:
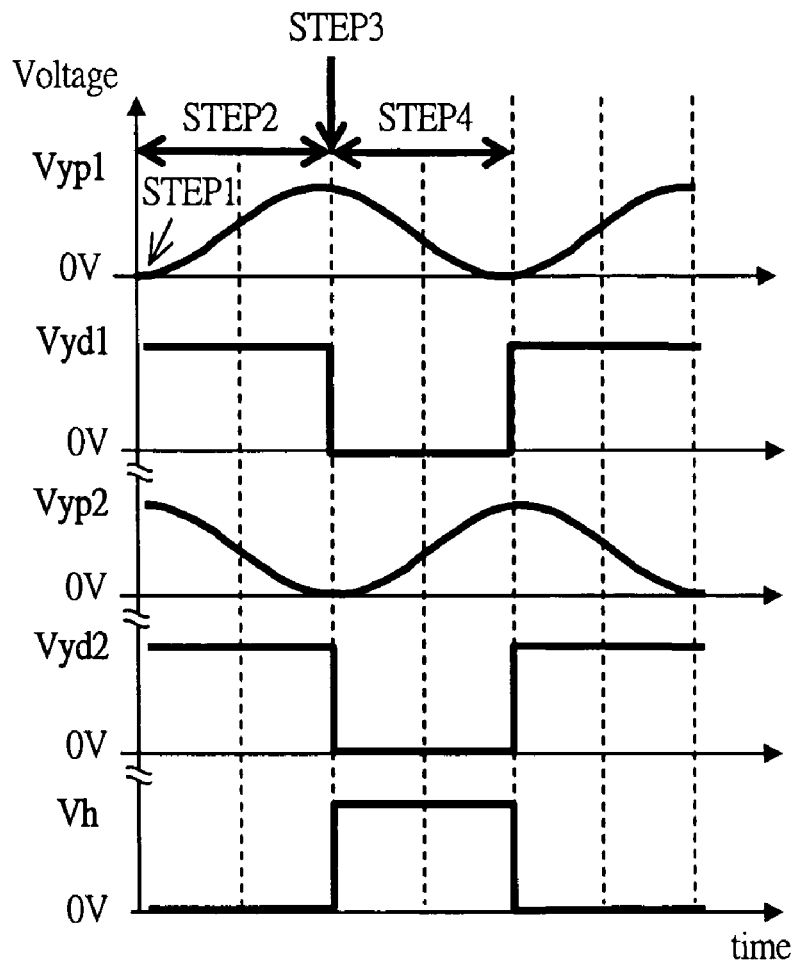
FIG. 6A is a timing chart of control signals for the driving system for moving the carrier stage in a Y-axis direction in the actuator according to the first embodiment of the present invention.
Figure 6B:
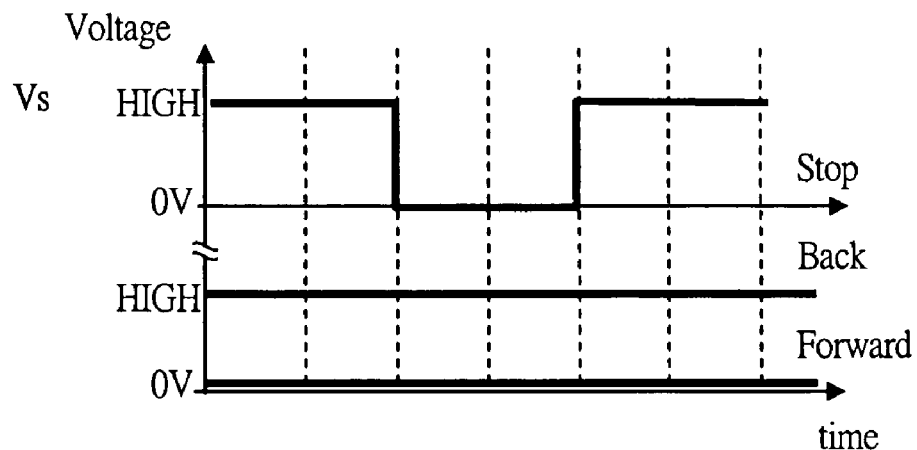
FIG. 6B is a timing chart of a control signal for the carrying system for moving the carrier stage in a Y-axis direction in the actuator according to the first embodiment of the present invention.

FIGS. 6A, 6B are timing charts of control signals of the actuator 1 driving the carrier stage 11 in the Y-axis direction. FIG. 6A shows control signals for the driving system, whilst FIG. 6B shows a control signal for the carrying system.

A reference symbol Vyp1 in FIG. 6A denotes a signal causing the piezoelectric element that is a driving source of the driving stage having the third driving electrode 18c mounted thereon to extend and contract, a reference symbol Vyd1 denotes a control signal applied to the third driving electrode 18c, a reference symbol Vyp2 denotes a signal causing the piezoelectric element that is a driving source of the driving stage having the fourth driving electrode 18d mounted thereon to extend and contract, and a reference symbol Vyd2 denotes a control signal applied to the fourth driving electrode 18d. A reference symbol Vs in FIG. 6B denotes a control signal applied to the carrier electrode 15 on the carrier stage 11 disposed at a position so as to face the first driving electrode 18a, the second driving electrode 18b, the third driving electrode 18c, and the fourth driving electrode 18d. The carrier stage 11 has three types of operation mode, that is, Forward mode (forward operation), Back mode (backward operation), and Stop mode (stop operation). Corresponding to the operation mode of the carrier stage, the timing chart of the control signal Vs applied to the carrier electrode 15 is different.

Here, the Forward mode of the actuator 1 in the Y-axis direction is described. It is assumed that, in an initial stationary state, signals applied to all electrodes are zero volt (0V).

First, in STEP 1 which is a start of the operation of the actuator 1, LOW is inputted to the control signal Vs applied to the carrier electrode 15, HIGH is inputted to the signal Vyd1 applied to the third driving electrode 18c, and HIGH is inputted to the signal Vyd2 applied to the fourth driving electrode 18d, thereby providing a potential difference between the carrier electrode 15 and each of the driving electrodes 18c, 18d. With electrostatic force, the carrier stage 11 is adsorbed to the third driving electrode 18c and the fourth driving electrode 18d.

Next, in STEP 2, the signal Vyp1 applied to the piezoelectric element that is a driving source of the driving stage having the third driving electrode 18c mounted thereon is set to be a signal that causes the piezoelectric element to make a transition from a contracting state to an extending state. The signal Vyp2 applied to the piezoelectric element that is a driving source of the driving stage having the fourth driving electrode 18d mounted thereon is set to be a signal that causes the piezoelectric element to make a transition from an extending state to a contracting state. The extending or contracting operation of the third piezoelectric element does not match with that of the fourth piezoelectric element, and in the case where these two piezoelectric elements are disposed in uniaxial direction (the Y-axis direction), they make an extending or contracting operation in the same direction. With the electrostriction of the third and fourth piezoelectric elements described above, the third driving electrode 18c and the fourth driving electrode 18d are moved. At this time, since the carrier stage 11 is adsorbed to both of the third driving electrode 18c and the fourth driving electrode 18d, the carrier stage 11 moves in the forward direction by an amount of the electrostriction displacement of one piezoelectric element.

Next, in STEP 3, LOW is applied to the third driving electrode 18c and the fourth driving electrode 18d to release adsorption of the carrier stage 11 and the driving electrodes 18c, 18d. At the same time, HIGH is applied to the holding electrode 21 to newly adsorb the carrier electrode 15 and the holding electrode 21 with electrostatic force.

Next, in STEP 4, the signal Vyp1 applied to the third piezoelectric element is set to be a signal that causes the third piezoelectric element to make a transition from an extending state to a contracting state. The signal Vyp2 applied to the fourth piezoelectric element is set to be a signal that causes the fourth piezoelectric element to make a transition from a contracting state to an extending state. The extending or contracting operation of the third piezoelectric element does not match with that of the fourth piezoelectric element, and in the case where these two piezoelectric elements are disposed in uniaxial direction (the Y-axis direction), they make an extending or contracting operation in the same direction. With the electrostriction of the third and fourth piezoelectric elements described above, the third driving electrode 18c and the fourth driving electrode 18d are moved to the state in STEP 1. At this time, the carrier electrode 15 is still adsorbed to the holding electrode 21. And therefore, even when each of the driving electrodes 18c, 18d return to the state of STEP 1, the carrier electrode 15 is still adsorbed to the holding electrode 21.

STEP 1 to STEP 4 are a one-cycle operation of the actuator 1 driving the carrier stage 11 in the Y-axis direction. The piezoelectric elements and the driving electrodes 18c, 18d return to the initial positions in STEP 1 after one cycle respectively, but the carrier stage 11 moves in the forward direction by an amount of electrostriction of the third and fourth piezoelectric elements after one cycle. By repeating this cycle, the carrier stage 11 successively moves in the Y-axis direction, which is the forward direction.

The Stop mode in which the carrier stage 11 becomes stationary and the Back mode can be achieved by changing only the signal applied to the carrier electrode 15 as shown in FIG. 6B, without changing the control signals for the driving system shown in FIG. 6A.

Note that, although the methods of driving in the X-axis and Y-axis directions have been described separately, they can operate independently from each other.

As described above, in the case where two driving units 12a, 12b are provided in the X-axis direction and two driving units 12c, 12d are provided in the Y-axis direction, in STEP 2, the carrier stage 11 is adsorbed to the driving electrodes 18a, 18b in the X-axis direction and to the driving electrodes 18c, 18d in the Y-axis direction through the carrier electrode 15. And therefore, driving force from both front and rear with respect to the forward directions, that is, the X-axis direction and the Y-axis direction, can be ensured. And therefore, in the actuator 1, the carrier stage 11 can be stably moved with stable driving force.

Note that, in the case where the maximum movement range of the carrier stage 11 in the actuator 1 is defined, a situation such that the location of the carrier stage 11 significantly deviates to a side of one of the driving electrodes and the carrier stage 11 cannot return to the initial position can be avoided.

Next, a method of manufacturing the actuator 1 according to the first embodiment of the present invention is described using FIGS. 7 to 12. FIGS. 7 to 12 are cross-sectional diagrams of a main part of the actuator 1 in the X-axis direction during manufacturing process. Here, only the driving units 12a, 12b and the holding unit 13 of the actuator 1 are described, and the same goes for the driving units 12c and 12d.

Figure 7:
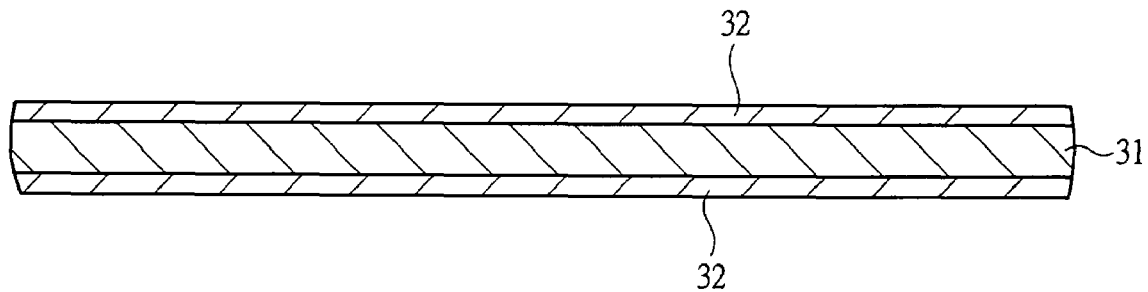
FIG. 7 is a cross-sectional diagram schematically showing a main part of the actuator during manufacturing according to the first embodiment of the present embodiment.

As shown in FIG. 7, silicon oxide films 32 are formed on both of front and rear surfaces of a monocrystal silicon wafer 31.

Figure 8:
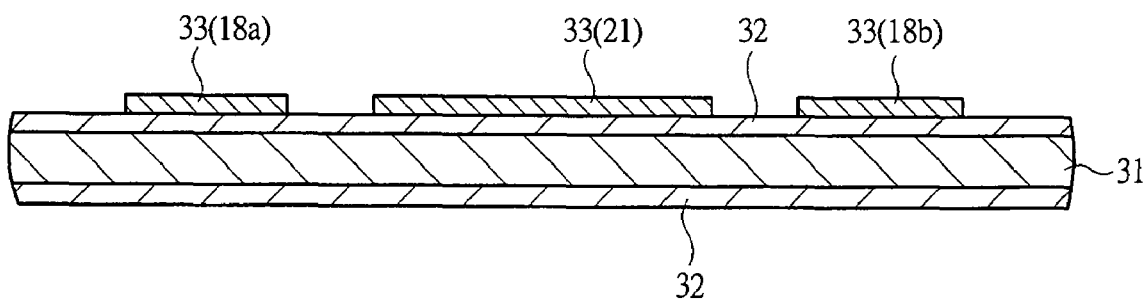
FIG. 8 is a cross-sectional diagram schematically showing the main part of the actuator during manufacturing continued from FIG. 7.

Next, as shown in FIG. 8, a metal film 33 to be the driving electrodes 18a, 18b and the holding electrode 21 is formed through plating, spattering, or CVD, and then a pattern is formed by photolithography. Types of this metal film include, for example, Cu, Al, and W.

Figure 9:
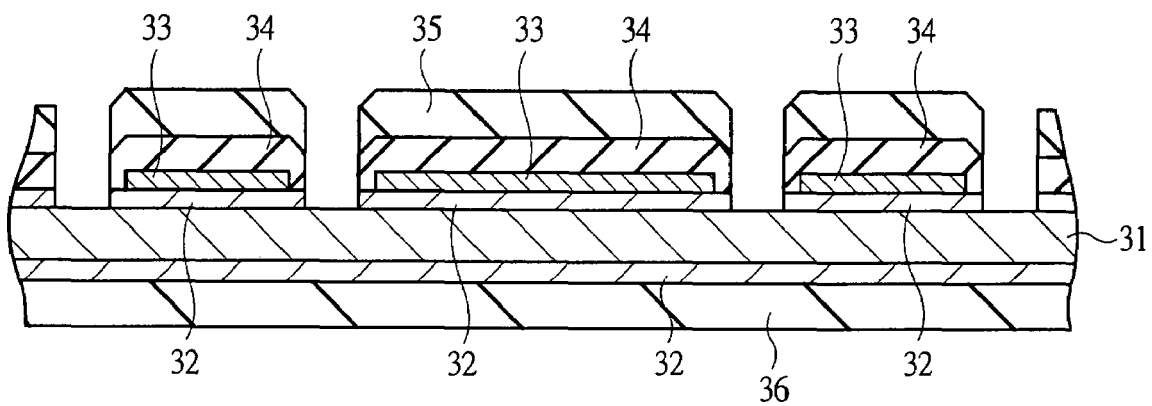
FIG. 9 is a cross-sectional diagram schematically showing the main part of the actuator during manufacturing continued from FIG. 8.

Next, as shown in FIG. 9, a protective film 34 for protecting the metal film 33 is formed. Then, a photoresist 35 is applied and a pattern is formed by photolithography. Using the formed pattern by the photoresist 35 as a mask, a pattern is formed on the protective film 34 and the silicon oxide film 32 through wet etching or dry etching. And, on the rear surface of the wafer, a protective film 36 for protecting the silicon oxide film is formed, thereby preventing a loss of the silicon oxide film on the rear surface at wet etching or dry etching. After pattern formation, the photoresist 35 and the protective film 36 on the rear surface are removed.

Figure 10:
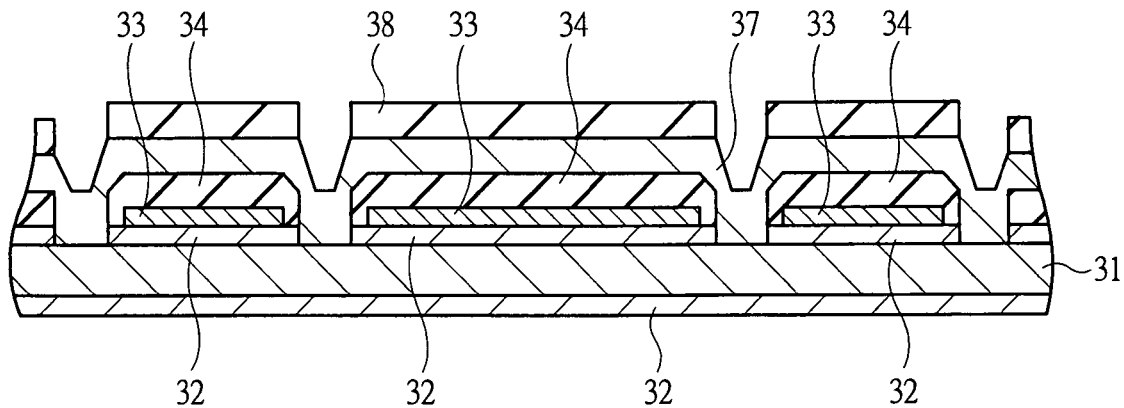
FIG. 10 is a cross-sectional diagram schematically showing the main part of the actuator during manufacturing continued from FIG. 9.

Next, as shown in FIG. 10, a metal mask 37 to be a mask for processing the monocrystal silicon wafer 31 is formed on the front surface through spattering. After applying a photoresist 38 and forming a pattern through photolithography, a pattern of the metal mask is formed using the photoresist 38 as a mask. In the case where penetration processing of the silicon wafer is performed using dry etching, the metal-mask material is preferably Al, which has a high etching-selectivity with silicon.

Figure 11:
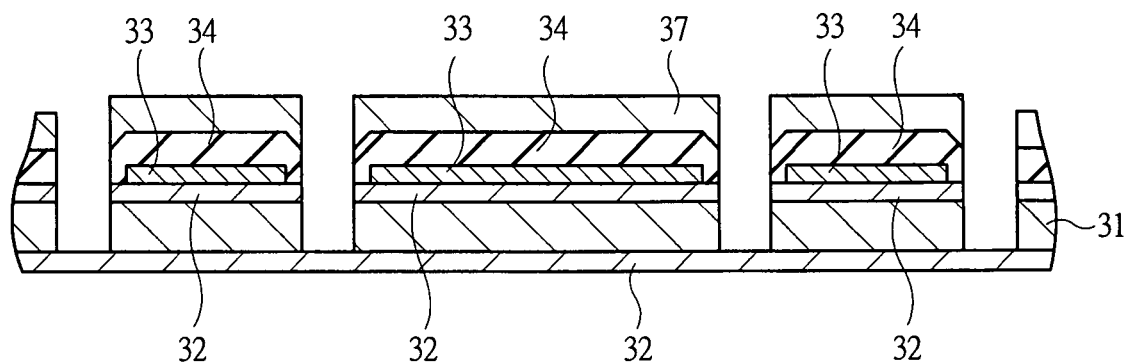
FIG. 11 is a cross-sectional diagram schematically showing the main part of the actuator during manufacturing continued from FIG. 10.

Next, as shown in FIG. 11, using the metal mask 37 as a mask, penetration processing of the silicon wafer 31 using dry etching is performed.

Figure 12:
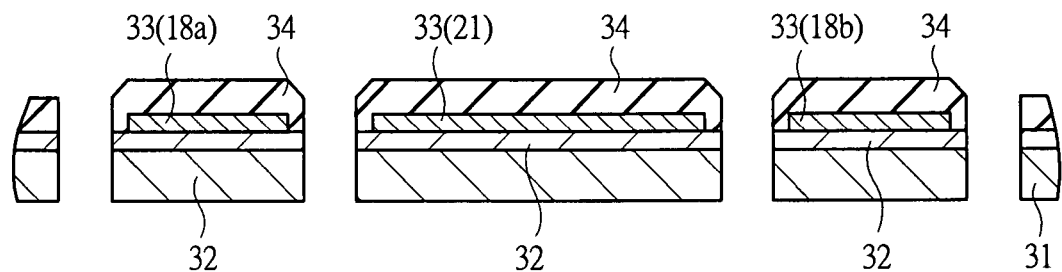
FIG. 12 is a cross-sectional diagram schematically showing the main part of the actuator during manufacturing continued from FIG. 11.

Next, as shown in FIG. 12, the silicon oxide film 32 on the rear surface is removed and the metal mask 37 is also removed, then the driving electrodes 18a, 18b and the holding electrode 21 can be integrally formed.

As described above, the substrate (silicon wafer 31) on which the driving electrodes 18a, 18b and the holding electrode 21, which are part of the mechanism of driving in the X-Y axes directions, can be manufactured with a high alignment accuracy in a horizontal direction. After that, the piezoelectric elements 17a, 17b to be driving sources and the carrier stage 11 having the carrier electrode 15 are assembled together, thereby manufacturing the actuator 1 according to the first embodiment as shown in FIGS. 3 and 4. Furthermore, assembly with the probe substrate 53 having probes 52 and packaging are preformed, and the probe memory 50 including the actuator 1 according to the first embodiment shown in FIGS. 1 and 2 can be manufactured. Note that, for manufacturing the probe memory 50, the MEMS (Micro Electro Mechanical Systems) technology is used.

Second Embodiment

In the first embodiment, the case has been described in which the actuator system of the piezoelectric driving-electrostatic adsorption type includes the holding unit provided with the holding electrode in the mechanism of driving the carrier stage having the recording medium mounted thereon in the X-Y axes directions. However, in a second embodiment, a case in which the holding unit is not included is described.

Figure 13:
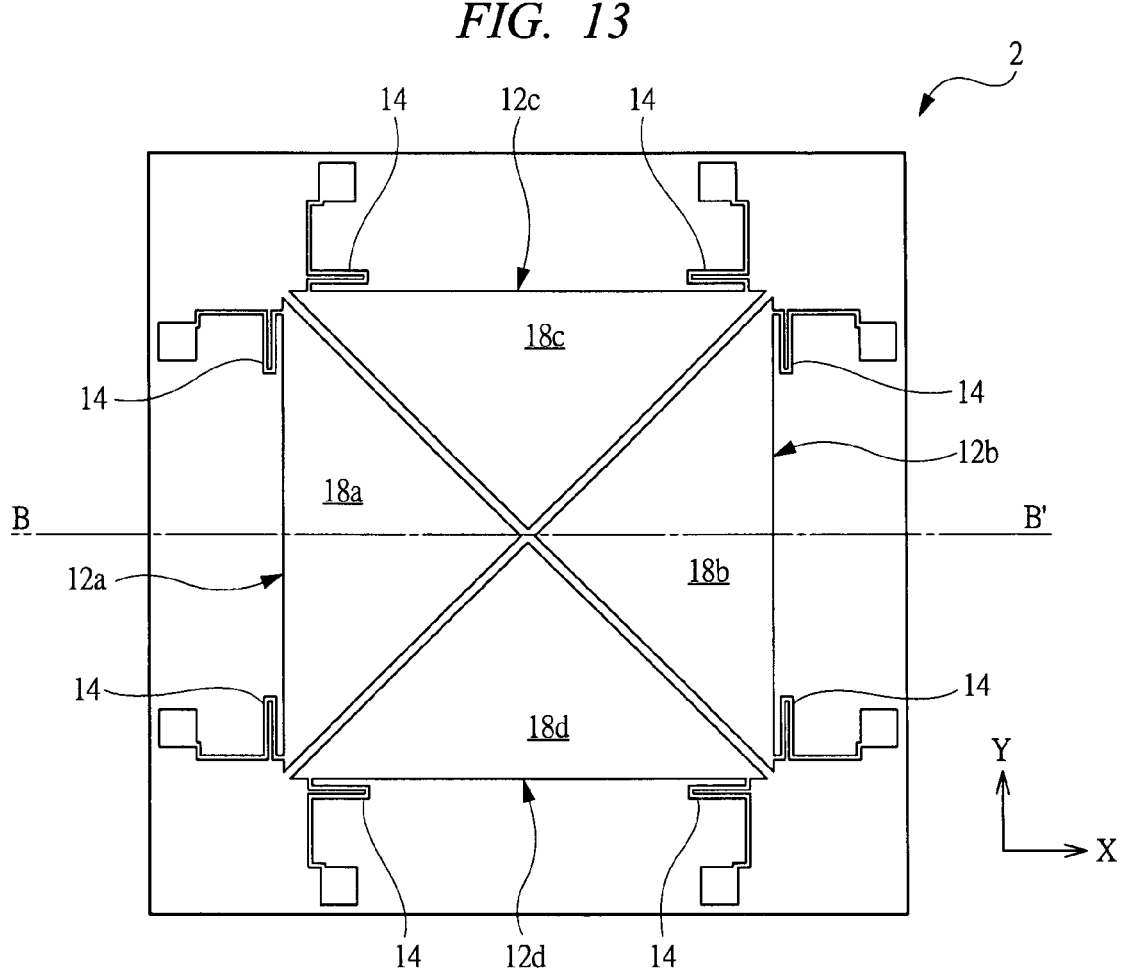
FIG. 13 is a plane diagram schematically showing a main part of an actuator according to a second embodiment of the present invention.
Figure 14:
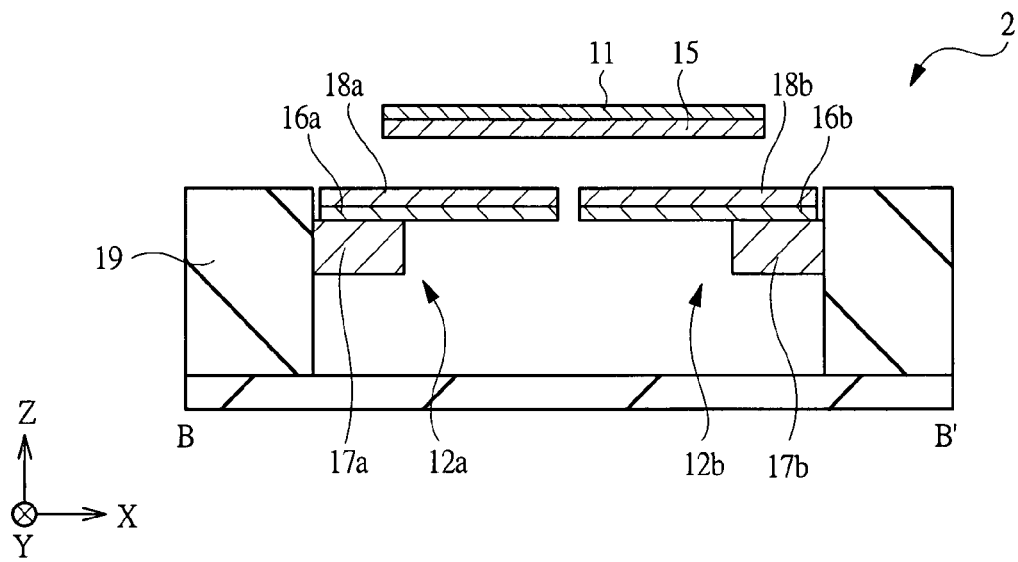
FIG. 14 is a cross-sectional diagram along a B-B' line of FIG. 13.

A configuration of an actuator system of the piezoelectric driving-electrostatic adsorption type (hereinafter referred to as an actuator) according to the second embodiment is described using FIGS. 13 and 14. FIG. 13 is a plan diagram of an actuator 2 according to the second embodiment. FIG. 14 is a cross-sectional diagram along a B-B' line in FIG. 13. Note that, in FIG. 13, although a carrier stage 11 is omitted, the carrier stage 11 has a rectangular shape in a plan-view shape of X-Y plane, as shown in FIG. 1. And, in FIG. 14, for ease of description, the carrier stage 11 is shown as being separated from driving units 12a and 12b. In practice, however, the carrier stage 11 is provided so as to make contact with the driving units 12a and 12b.

As shown in FIG. 13, the actuator 2 is provided with, at its center area, four driving units, that is, a first driving unit 12a having a first driving electrode 18a, a second driving unit 12b having a second driving electrode 18b, a third driving unit 12c having a third driving electrode 18c, and a fourth driving unit 12d having a fourth driving electrode 18d. The driving unit 12a and the driving unit 12b are provided so as to face each other in the X-axis direction, whilst the driving unit 12c and the driving unit 12d are provided so as to face each other in the Y-axis direction.

These driving units 12a to 12d are connected to an elastic unit 14. This elastic unit 14 extends and contracts so as to allow the driving units 12a to 12d to move. And therefore, the driving units 12a, 12b move in the X-axis direction, whilst the driving units 12c, 12d move in the Y-axis direction.

Note that, an effective area of the carrier stage 11 is assumed to be within a range not exceeding outer perimeter edges of the driving units 12a to 12d, and a maximum movement range of the carrier stage 11 in the actuator 2 is preferably within the range not exceeding the outer perimeter edges of the driving units 12a to 12d.

As shown in FIG. 14, the actuator 2 includes the carrier stage 11 composed of a substrate moving in the two axial directions (X- and Y-axis directions), the first driving unit 12a and the second driving unit 12b provided to face the carrier stage 11 and moving the carrier stage 11 in one axial directions (the X-axis direction), and is a mechanism that drives the carrier stage 11 in the biaxial directions.

And, the carrier stage 11 has a carrier electrode 15 provided on a surface of the carrier stage 11 on a driving units 12a, 12b side. Furthermore, the driving units 12a, 12b include driving stages 16a, 16b, respectively, as base materials, and further include piezoelectric elements 17a, 17b provided on lower surfaces of the driving stages 16a, 16b, respectively, and expanding and contracting in the X-axis direction, and driving electrodes 18a, 18b provided on surfaces of the driving stages 16a and 16b on a carrier stage 11 side respectively and electrostatically adsorbing the carrier electrode 15. The piezoelectric elements 17a, 17b are fixed to a supporting frame 19.

And, with an insulating film not shown being provided on a surface of the carrier electrode 15 on a driving electrodes 18a, 18b side, the driving electrodes 18a, 18b are electrically insulated from the carrier electrode 15.

Note that, in FIG. 14, the driving units 12a, 12b of FIG. 13 in the X-axis direction are shown, and the same goes for the driving units 12c, 12d of FIG. 13 in the Y-axis direction.

As described above, in the actuator 2 according to the second embodiment, since the driving units 12a to 12d (the driving electrodes 18a to 18d) play not only a role of moving the carrier stage 11 but also a role of holding (supporting) the carrier stage 11, no holding unit is required. And therefore, the number of components can be reduced.

Also, in the actuator 2 according to the second embodiment, the plurality of driving units 12a, 12b are provided in the X-axis direction (one axial direction of the biaxial directions), and the plurality of the driving units 12c, 12d are provided in the Y-axis direction (the other one axial direction of the biaxial directions). And therefore, with the plurality of driving units (for example, the first driving unit 12a and the second driving unit 12b) being provided in uniaxial direction (for example, the X-axis direction), the actuator 2 can be stably operated. The operation of this actuator 2 is described below using FIGS. 15A to 16B.

First, a method of moving the carrier stage 11 in the X-axis direction in the actuator 2 according to the second embodiment is described.

Figure 15A:
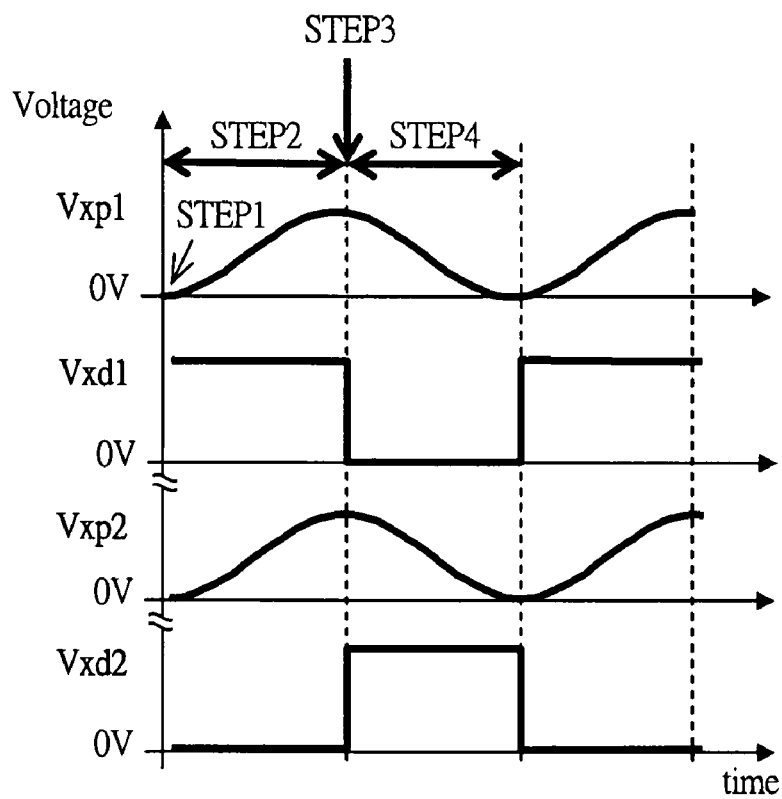
FIG. 15A is a timing chart of control signals for a driving system for moving a carrier stage in an X-axis direction in the actuator according to the second embodiment of the present invention.
Figure 15B:
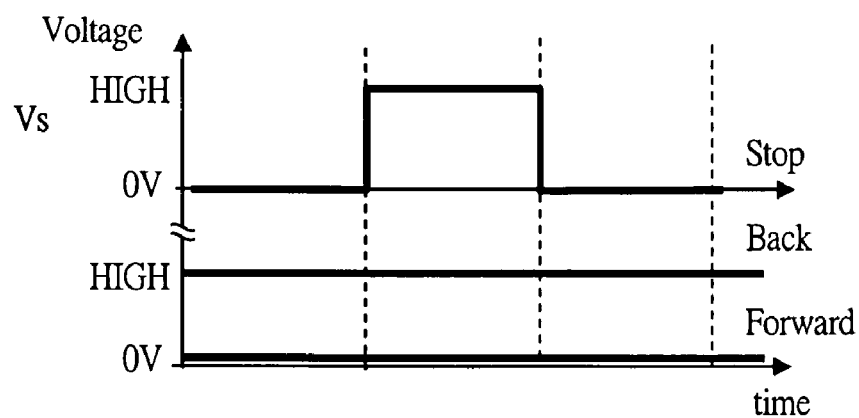
FIG. 15B is a timing chart of a control signal for a carrying system for moving the carrier stage in an X-axis direction in the actuator according to the second embodiment of the present invention.

FIGS. 15A and 15B are timing charts of control signals of the actuator 2 driving the carrier stage 11 in the X-axis direction. FIG. 15A shows control signals for a driving system. FIG. 15B shows a control signal for a carrying system.

A reference symbol Vxp1 in FIG. 15A denotes a signal causing the first piezoelectric element 17a to extend and contract, a reference symbol Vxd1 denotes a control signal applied to the first driving electrode 18a, a reference symbol Vxp2 denotes a signal causing the second piezoelectric element 17b to extend and contract, and a reference symbol Vxd2 denotes a control signal applied to the second driving electrode 18b. A reference symbol Vs in FIG. 15B denotes a control signal applied to the carrier electrode 15. The carrier stage 11 has three types of operation mode, that is, Forward mode (forward operation), Back mode (backward operation), and Stop mode (stop operation). Corresponding to the operation mode of the carrier stage 11, the timing chart of the control signal Vs applied to the carrier electrode 15 is different.

Here, the Forward mode of the actuator 2 in the X-axis direction is described. It is assumed that, in an initial stationary state, signals applied to all electrodes are zero (0V).

In STEP 1 which is a start of the operation of the actuator 2, LOW is inputted to the control signal Vs applied to the carrier electrode 15, HIGH is inputted to the signal Vxd1 applied to the first driving electrode 18a, and LOW is inputted to the signal Vxd2 applied to the second driving electrode 18b, thereby providing a potential difference between the carrier electrode 15 and the first driving electrode 18a. With electrostatic force, the carrier electrode 15 is adsorbed to the first driving electrode 18a.

In STEP 2, the signal Vxp1 applied to the first piezoelectric element 17a is set to be a signal that causes the piezoelectric element 17a to make a transition from a contracting state to an extending state. The signal Vxp2 applied to the second piezoelectric element 17b is set to be a signal that causes the piezoelectric element 17b to make a transition from a contracting state to an extending state. The extending or contracting operation of the first piezoelectric element 17a matches with that of the second piezoelectric element 17b, and in the case where these two piezoelectric elements 17a, 17b are disposed in uniaxial direction (the X-axis direction), they make an extending or contracting displacement so as to be closer to each other or away from each other. With the electrostriction of the first piezoelectric element 17a and the second piezoelectric element 17b described above, the driving electrodes 18a, 18b are moved. At this time, since the carrier electrode 15 is adsorbed only to the first driving electrode 18a, the carrier electrode 15 moves in a forward direction by an amount of electrostriction displacement of the first piezoelectric element 17a.

In STEP 3, LOW is applied to the first driving electrode 18a to release adsorption of the carrier stage 11 and the first driving electrode 18a. At the same time, HIGH is applied to the second driving electrode 18b to newly adsorb the carrier electrode 15 and the second driving electrode 18b with electrostatic force.

In STEP 4, the signal Vxp1 applied to the first piezoelectric element 17a is set to be a signal that causes the piezoelectric element 17a to make a transition from an extending state to a contracting state. The signal Vxp2 applied to the second piezoelectric element 17b is set to be a signal that causes the piezoelectric element 17b to make a transition from an extending state to a contracting state. The extending or contracting operation of the first piezoelectric element 17a matches with that of the second piezoelectric element 17b. When these two piezoelectric elements 17a, 17b are disposed in uniaxial direction (the X-axis direction), they make an extending or contracting displacement so as to be closer to each other or away from each other. With the electrostriction of the first piezoelectric element 17a and the piezoelectric element 17b described above, the first driving electrode 18a and the second driving electrode 18b are moved to the state in STEP 1. At this time, the carrier electrode 15 is still adsorbed to the second driving electrode 18b. And therefore, even when each of the driving electrodes 18a, 18b return to the state of STEP 1, the carrier electrode 15 is still adsorbed to the second driving electrode 18b.

STEP 1 to STEP 4 described above are a one-cycle operation of the actuator 2 according to the second embodiment. The piezoelectric elements 17a, 17b and the driving electrodes 18a, 18b return to the initial positions in STEP 1 after one cycle, respectively, but the carrier stage 11 moves in the forward direction by a total of the amount of electrostriction of the piezoelectric element 17a and the amount of electrostriction of the piezoelectric element 17b after one cycle. By repeating this cycle, the carrier stage 11 successively moves in the X-axis direction, which is a forward direction.

The Stop mode in which the carrier stage 11 becomes stationary and the Back mode can be achieved by changing only the signal applied to the carrier electrode 15 as shown in FIG. 15B, without changing the control signals for the driving system shown in FIG. 15A.

Next, a method of moving the carrier stage 11 in the Y-axis direction in the actuator 2 according to the second embodiment is described.

Figure 16A:
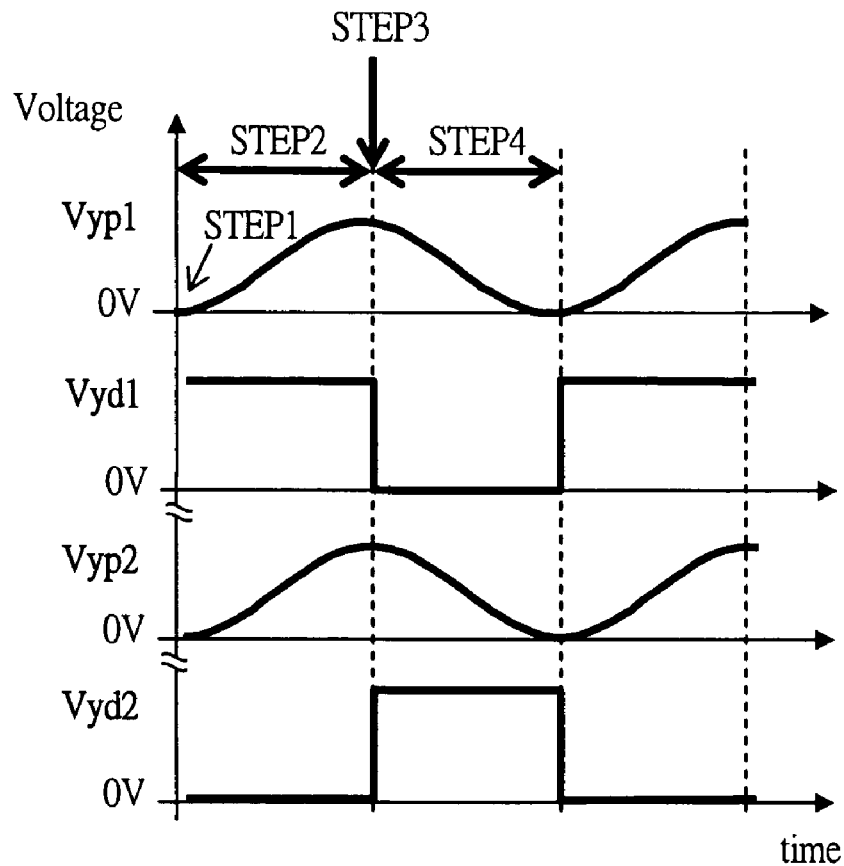
FIG. 16A is a timing chart of control signals for the driving system for moving the carrier stage in a Y-axis direction in the actuator according to the second embodiment of the present invention.
Figure 16B:
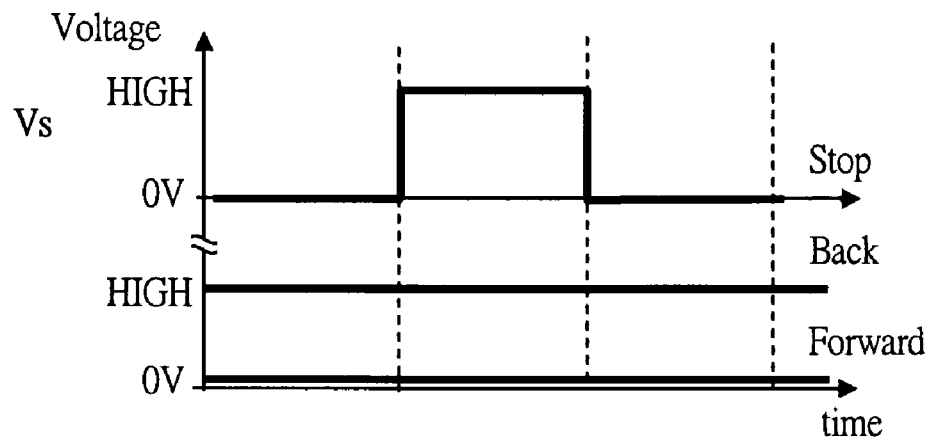
FIG. 16B is a timing chart of a control signal for the carrying system for moving the carrier stage in a Y-axis direction in the actuator according to the second embodiment of the present invention.

FIGS. 16A and 16B are timing charts of control signals of the actuator 2 driving the carrier stage 11 in the Y-axis direction. FIG. 16A shows control signals for the driving system, whilst FIG. 16B shows a control signal for the carrying system.

A reference symbol Vyp1 in FIG. 16A denotes a signal causing the third piezoelectric element that is a driving source of the driving stage having the third driving electrode 18c mounted thereon to extend and contract, a reference symbol Vyd1 denotes a control signal applied to the third driving electrode 18c, a reference symbol Vyp2 denotes a signal causing the fourth piezoelectric element that is a driving source of the driving stage having the fourth driving electrode 18d mounted thereon to extend and contract, and a reference symbol Vyd2 denotes a control signal applied to the fourth driving electrode 18d. A reference symbol Vs in FIG. 16B denotes a control signal applied to the carrier electrode 15 on the carrier stage 11 disposed at a position so as to face the first driving electrode 18a, the second driving electrode 18b, the third driving electrode 18c, and the fourth driving electrode 18d. The carrier stage 11 has three types of operation mode, that is, Forward mode (forward operation), Back mode (backward operation), and Stop mode (stop operation). Corresponding to the operation mode of the carrier stage 11, the timing chart of the control signal Vs applied to the carrier electrode 15 is different.

Here, the Forward mode of the actuator 2 in the Y-axis direction is described. It is assumed that, in an initial stationary state, signals applied to all electrodes are zero (0V).

First, in STEP 1 which is a start of the operation of the actuator 2, LOW is inputted to the control signal Vs applied to the carrier electrode 15, HIGH is inputted to the signal Vyd1 applied to the third driving electrode 18c, and LOW is inputted to the signal Vyd2 applied to the fourth driving electrode 18d, thereby providing a potential difference between the carrier electrode and the driving electrodes 18c. With electrostatic force, the carrier electrode 15 is adsorbed to the third driving electrode 18c and the fourth driving electrode 18d.

Next, in STEP 2, the signal Vyp1 applied to the third piezoelectric element that is a driving source of the driving stage having the third driving electrode 18c mounted thereon is set to be a signal that causes the piezoelectric element to make a transition from a contracting state to an extending state. The signal Vyp2 applied to the fourth piezoelectric element that is a driving source of the driving stage having the fourth driving electrode 18d mounted thereon is set to be a signal that causes the piezoelectric element to make a transition from a contracting state to an extending state. The extending or contracting operation of the third piezoelectric element matches with that of the fourth piezoelectric element, and in the case where the two piezoelectric elements are disposed in uniaxial direction, they make an extending or contracting displacement so as to be closer to each other or away from each other. With the electrostriction of these third and fourth piezoelectric elements, the third electrode 18c and the fourth driving electrode 18d are moved. At this time, since the carrier electrode 15 is adsorbed only to the third driving electrode 18c, the carrier stage 15 moves in a forward direction by an amount of electrostriction displacement of the third piezoelectric element.

Next, in STEP 3, LOW is applied to the third driving electrode 18c to release adsorption of the carrier electrode 15 and the third driving electrode 18c. At the same time, HIGH is applied to the fourth driving electrode 18d to newly adsorb the carrier electrode 15 and the fourth driving electrode 18d with electrostatic force.

In STEP 4, the signal Vyp1 applied to the third piezoelectric element is set to be a signal that causes the third piezoelectric element to make a transition from an extending state to a contracting state. The signal Vyp2 applied to the fourth piezoelectric element is set to be a signal that causes the third piezoelectric element to make a transition from an extending state to a contracting state. The extending or contracting operation of the third piezoelectric element matches with that of the fourth piezoelectric element, and in the case where these two piezoelectric elements are disposed in uniaxial direction, they make an extending or contracting displacement so as to be closer to each other or away from each other. With the electrostriction of the third and fourth piezoelectric elements described above, the third driving electrode 18c and the fourth driving electrode 18d are moved to the state in STEP 1. At this time, the carrier electrode 15 is still adsorbed to the fourth driving electrode 18d. And therefore, when the driving electrodes 18c, 18d return to the state of STEP 1 respectively, the carrier electrode 15 is still adsorbed to the fourth driving electrode 18d.

STEP 1 to STEP 4 described above are a one-cycle operation of the actuator 2 according to the second embodiment. The piezoelectric elements and the driving electrodes 18c, 18d return to the initial positions in STEP 1 after one cycle respectively, but the carrier stage 11 moves in the forward direction by a total of the amount of electrostriction of the third and the amount of electrostriction of fourth piezoelectric elements after one cycle. By repeating this cycle, the carrier stage 11 successively moves in the Y-axis direction, which is a forward direction.

The Stop mode in which the carrier stage 11 becomes stationary and the Back mode can be achieved by changing only the signal applied to the carrier electrode 15 as shown in FIG. 16B, without changing the control signals for the driving system shown in FIG. 16A.

Note that, although the methods of driving in the X-axis direction and in the Y-axis direction have been described separately, they can operate independently from each other.

As described above, in the case where the two driving units 12a, 12b are provided in the X-axis direction and two driving units 12c, 12d are provided in the Y-axis direction, in STEP 2, since the carrier stage 11 is adsorbed to the driving electrodes 18a, 18b in the X-axis direction and to the driving electrodes 18c, 18d in the Y-axis direction through the carrier electrode 15, driving force from both front and rear with respect to the forward directions, that is, the X-axis direction and the Y-axis direction, can be ensured. And therefore, in the actuator 2, the carrier stage 11 can be stably moved with stable driving force.

And, in the case where two driving units 12a, 12b are provided in the X-axis direction and two driving units 12c, 12d are provided in the Y-axis direction, since the carrier stage 11 moves with the first driving electrode 18a or the third driving electrode 18c in STEP 2, whilst the carrier stage 11 moves with the second driving electrode 18b or the fourth driving electrode 18d in STEP 4, the actual operation speed is at least doubled compared with speed of the actuator 101 studied by the inventors.

Note that, in the case where the maximum movement range of the carrier stage 11 in the actuator 2 is defined, a situation such that the location of the carrier stage 11 significantly deviates to a side of one of the driving electrodes and the carrier stage 11 cannot return to the initial position can be avoided.

Third Embodiment

Figure 17:
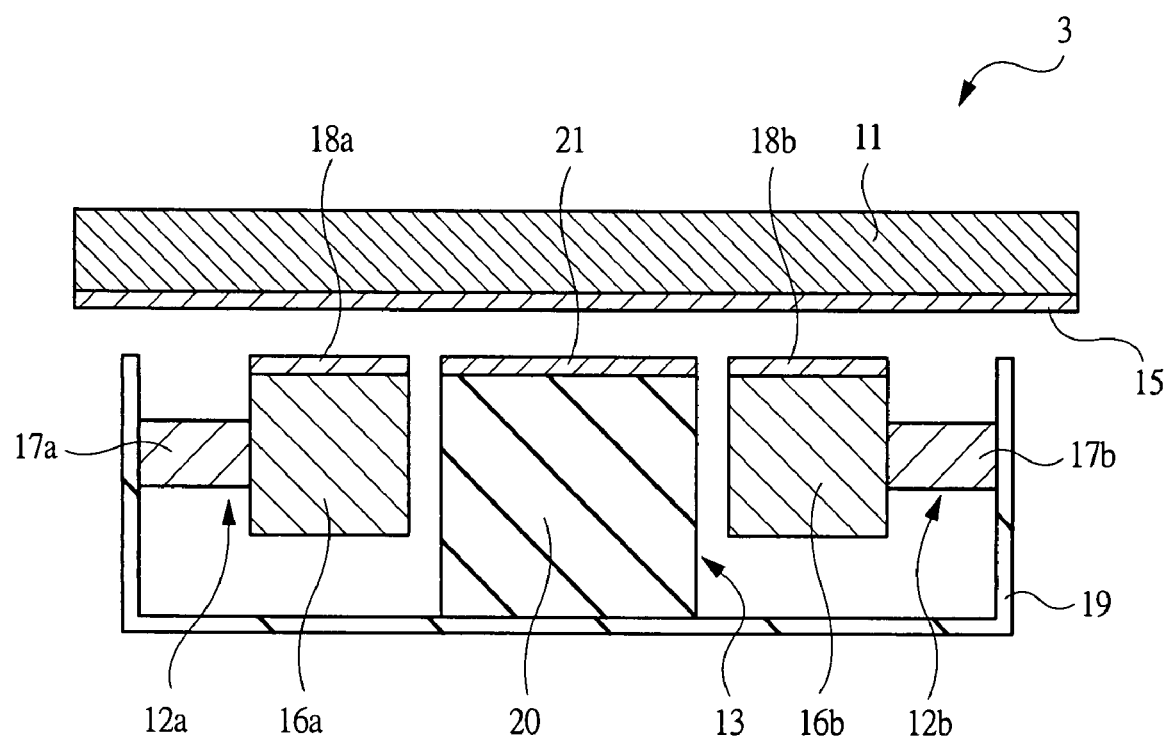
FIG. 17 is a cross-sectional diagram schematically showing a main part of an actuator according to a third embodiment of the present invention.
Figure 18A:
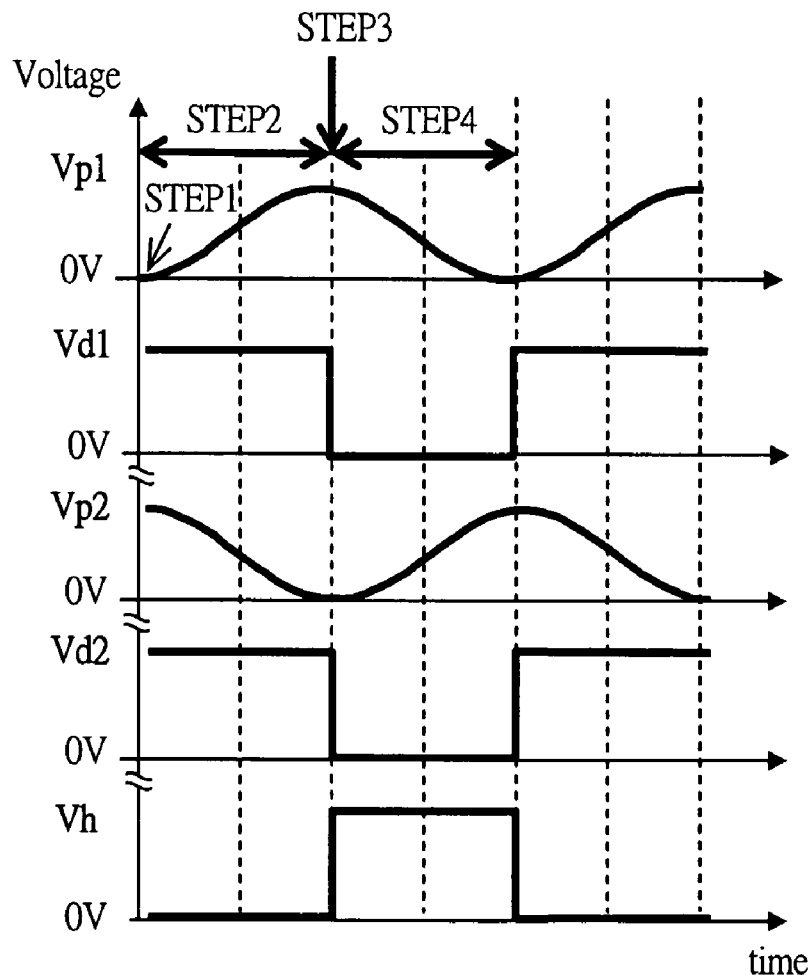
FIG. 18A is a timing chart of control signals for a driving system for moving a carrier stage in the actuator according to the third embodiment of the present invention.
Figure 18B:
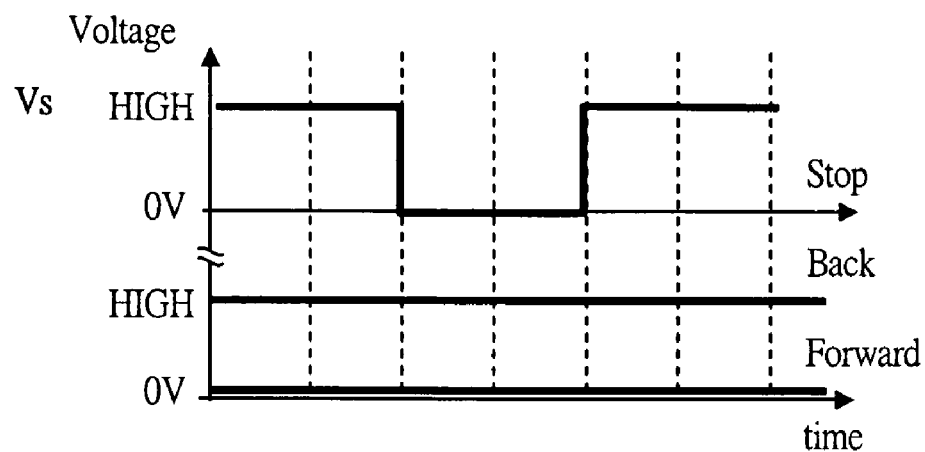
FIG. 18B is a timing chart of a control signal for a carrying system for moving the carrier stage in the actuator according to the third embodiment of the present invention.

An actuator system of the piezoelectric driving-electrostatic adsorption type (hereinafter referred to as an actuator) according to a third embodiment of the present invention is described using FIGS. 17, 18A, and 18B. FIG. 17 is a cross-sectional diagram of a main part of an actuator according to the third embodiment. FIGS. 18A and 18B are timing charts of control signals of the actuator of FIG. 17. FIG. 18A shows control signals for a driving system, whilst FIG. 18B is shows a control signal for a carrying system. Note that, in FIG. 17 for ease of description, a carrier stage 11 is shown as being separated from driving units 12a, 12b and a holding unit 13. In practice, however, the carrier stage 11 is provided so as to make contact with the driving units 12a, 12b and the holding unit 13.

As shown in FIG. 17, the actuator 3 according to the third embodiment includes the carrier stage 11 composed of a substrate moving in biaxial directions (X-Y axes directions), the first driving unit 12a and the second driving unit 12b provided to face the carrier stage 11 and moving the carrier stage 11 in uniaxial direction (an X-axis direction), and the holding unit 13 provided to face the carrier stage 11 and holding the carrier stage 11, and is a mechanism that drives the carrier stage 11 having a recording medium mounted thereon in the biaxial directions. The first driving unit 12a, the second driving unit 12b and the holding unit 13 are provided in an arrangement in which the driving units 12a, 12b are provided on both sides of the holding unit 13 in the X-axis direction.

And, the carrier stage 11 has a carrier electrode 15 provided on a surface of the carrier stage 11 on a driving unit 12a, 12b side. Furthermore, the driving units 12a, 12b include driving stages 16a, 16b as base materials (third substrate), and further include piezoelectric elements 17a, 17b provided on side surfaces of driving stages 16a, 16b and expanding and contracting in the X-axis direction, and driving electrodes 18a, 18b provided on surfaces of the driving stages 16a, 16b on a carrier stage 11 side and electrostatically adsorbing the carrier electrode 15. The piezoelectric elements 17a, 17b are fixed to a supporting frame 19. And, the holding unit 13 includes a base frame 20 fixed to the supporting frame 19 as a base material, and also includes a holding electrode 21 provided on a surface of the base frame 20 on a carrier stage 11 side electrostatically adsorbing the carrier electrode 15.

And, with an insulating film not shown being provided on a surface of the carrier electrode 15 on a driving electrodes 18a, 18b side, the driving electrodes 18a, 18b, and the holding electrode 21 are electrically insulated from the carrier electrode 15.

As described above, in the actuator 3 according to the third embodiment, the plurality of driving units 12a, 12b is provided in the X-axis direction (one axial direction of the biaxial directions). And therefore, with the plurality of the driving units (for example, the first driving unit 12a and the second driving unit 12b) provided in uniaxial direction (for example, X-axis directions), the actuator 3 can be stably operated. Furthermore, the driving units 12a, 12b are provided on both sides of the holding unit 13 in the X-axis direction. With this, the actuator 3 can be more stably operated. The stable operation of this actuator 3 is described below using FIGS. 18A and 18B.

A reference symbol Vp1 in FIG. 18A denotes a signal causing the first piezoelectric element 17a to extend and contract, a reference symbol Vd1 denotes a control signal applied to the first driving electrode 18a, a reference symbol Vp2 denotes a signal causing the second piezoelectric element 17b to extend and contract, a reference symbol Vd2 denotes a control signal applied to the second driving electrode 18b, and a reference symbol Vh denotes a control signal applied to the holding electrode 21. And, a reference symbol Vs in FIG. 18B denotes a control signal applied to the carrier electrode 15. The carrier stage 11 has three types of operation mode, that is, Forward mode (forward operation), Back mode (backward operation), and Stop mode (stop operation). As shown in FIG. 18B, corresponding to the operation mode, the timing chart of the control signal Vs applied to the carrier electrode 15 is different.

Here, the Forward mode of the actuator 3 is described. It is assumed that, in an initial stationary state, signals applied to all electrodes are zero (0V).

First, in STEP 1 which is a start of the operation of the actuator 3, LOW is inputted to the control signal Vs applied to the carrier electrode 15, HIGH is inputted to the signal Vd1 applied to the first driving electrode, and HIGH is inputted to the signal Vd2 applied to the second driving electrode, thereby providing a potential difference between the carrier electrode 15 and the first driving electrode 18a and between the carrier electrode 15 and the second driving electrode 18b. With electrostatic force, the carrier electrode 15 is adsorbed to the first driving electrode 18a and the second driving electrode 18b.

Next, in STEP 2, the signal Vp1 applied to the first piezoelectric element 17a is set to be a signal that causes the piezoelectric element 17a to make a transition from a contracting state to an extending state. The signal Vp2 applied to the second piezoelectric element 17b is set to be a signal that causes the piezoelectric element 17b to make a transition from an extending state to a contracting state. The extending or contracting operation of the first piezoelectric element 17a does not match with that of the second piezoelectric element 17b. However, in the case where these two piezoelectric elements 17a, 17b are disposed in uniaxial direction, they make an extending or contracting operation in the same direction. With electrostriction of the piezoelectric elements 17a, 17b described above, the driving electrodes 18a, 18b are moved. At this time, since the carrier electrode 15 is adsorbed to both of the first driving electrode 18a and the second driving electrode 18b, the carrier electrode 15 moves in a forward direction by an amount of displacement in electrostriction of the first piezoelectric element 17a and the second piezoelectric element 17b.

Next, in STEP 3, LOW is applied to the first driving electrode 18a and LOW is applied to the second driving electrode 18b to release adsorption of the carrier electrode 15 and the driving electrodes 18a and 18b. At the same time, the signal Vh applied to the holding electrode 21 is set to HIGH to newly adsorb the carrier electrode 15 and the holding electrode 21 with electrostatic force.

Next, in STEP 4, the signal Vp1 applied to the first piezoelectric element 17a is set to be a signal that causes the piezoelectric element 17a to make a transition from an extending state to a contracting state. The signal Vp2 applied to the second piezoelectric element 17b is set to be a signal that causes the piezoelectric element 17b to make a transition from a contracting state to an extending state. Although the extending or contracting operation of the first piezoelectric element 17a does not match with that of the second piezoelectric element 17b, in the case where the two piezoelectric elements 17a, 17b are disposed in uniaxial direction, they make an extending or contracting operation in the same direction. With the electrostriction of the piezoelectric elements 17a, 17b described above, the driving electrodes 18a, 18b are moved to the state in STEP 1. At this time, the carrier electrode 15 is still adsorbed to the holding electrode 21. And therefore, even after the driving electrodes 18a, 18b return to the state of STEP 1 respectively, the carrier stage 11 is still held by the holding electrode 21.

STEP 1 to STEP 4 described above are a one-cycle operation of the actuator according to the third embodiment. The piezoelectric elements 17a, 17b and the driving electrodes 18a, 18b return to the initial positions in STEP 1 after one cycle respectively, but the carrier stage 11 moves in the forward direction by an amount of electrostriction of the piezoelectric elements 17a, 17b after one cycle. By repeating this cycle, the carrier stage 11 successively moves in the forward direction.

The Stop mode in which the carrier stage 11 becomes stationary and the Back mode can be achieved by changing only the signal applied to the carrier electrode 15 as shown in FIG. 18B, without changing the control signals for the driving system shown in FIG. 18A.

As described above, in the case where the two driving units 12a, 12b are provided in the X-axis direction, in STEP 2, since the carrier stage 11 is adsorbed to the driving electrodes 18a, 18b in the X-axis direction through the carrier electrode 15, driving force from both front and rear with respect to the forward directions, that is, the X-axis direction or the Y-axis direction, can be ensured. And therefore, in the actuator 3, the carrier stage 11 can be stably moved with stable driving force.

Fourth Embodiment

In the third embodiment, the case in which the actuator system of the piezoelectric driving-electrostatic adsorption type includes the holding unit provided with the holding electrode in the mechanism of driving the carrier stage in the X-Y axes directions has been described. In a fourth embodiment, a case in which a holding unit is not included is described.

Figure 19:
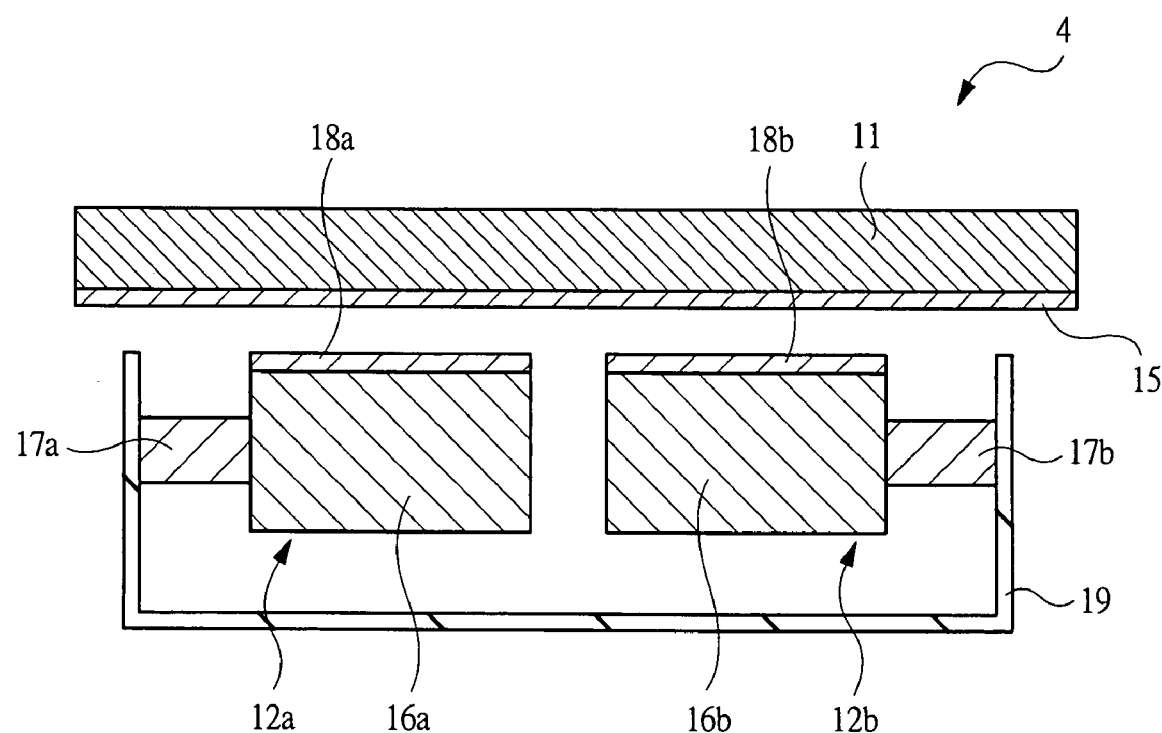
FIG. 19 is a cross-sectional diagram schematically showing a main part of an actuator according to a fourth embodiment of the present invention.
Figure 20A:
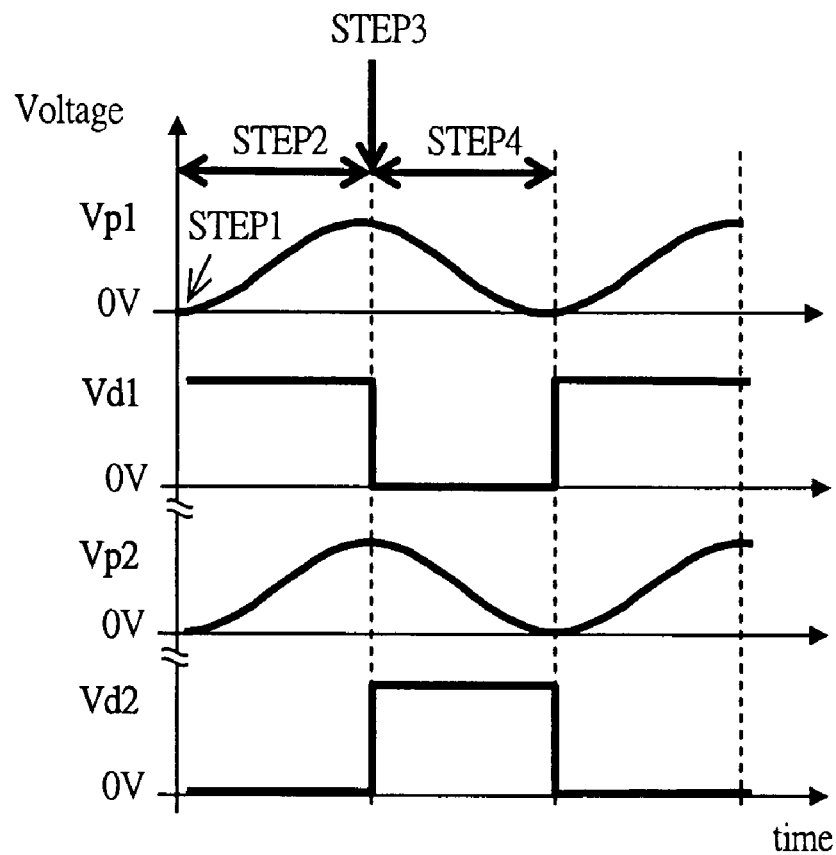
FIG. 20A is a timing chart of control signals for a driving system for moving a carrier stage in the actuator according to the fourth embodiment of the present invention.
Figure 20B:
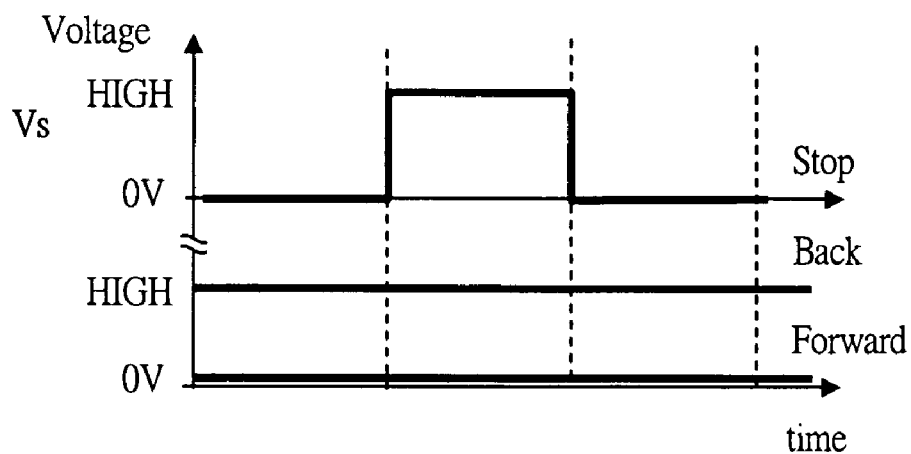
FIG. 20B is a timing chart of a control signal for a carrying system for moving the carrier stage in the actuator according to the fourth embodiment of the present invention.

An actuator system of the piezoelectric driving-electrostatic adsorption type (hereinafter referred to as an actuator) according to the fourth embodiment of the present invention is described using FIGS. 19, 20A and 20B. FIG. 19 is a cross-sectional diagram of a main part of the actuator according to the fourth embodiment of the present invention. FIGS. 20A and 20B are timing charts of control signals of the actuator of FIG. 19. FIG. 20a shows control signals for a driving system, whilst FIG. 20B shows a control signal for a carrying system. Note that, in FIG. 19, for ease of description, the carrier stage 11 is shown as being separated from driving units 12a, 12b. In practice, however, the carrier stage 11 is provided so as to make contact with the driving units 12a, 12b.

As shown in FIG. 19, the actuator 4 according to the fourth embodiment includes the carrier stage 11 composed of a substrate moving in biaxial directions (X-Y axes directions), the first driving unit 12a and the second driving unit 12b provided to face the carrier stage 11 and moving the carrier stage 11 in uniaxial direction (the X-axis direction), and is a mechanism that drives the carrier stage 11 in the biaxial directions.

And, the carrier stage 11 includes a carrier electrode 15 provided on a surface of the carrier stage 11 on a driving units 12a, 12b side. Furthermore, the driving units 12a, 12b include driving stages 16a, 16b as base materials, and further include piezoelectric elements 17a, 17b provided on side surfaces of the driving stages 16a, 16b and expanding and contracting in the X-axis direction, and driving electrodes 18a, 18b provided on surfaces of the driving stages 16a and 16b on a carrier stage 11 side and electrostatically adsorbing the carrier electrode 15. These piezoelectric elements 17a, 17b are fixed to a supporting frame 19.

And, with an insulating film not shown being provided on a surface of the carrier electrode 15 on a driving electrodes 18a, 18b side, the driving electrodes 18a, 18b are electrically insulated from the carrier electrode 15.

As described above, in the actuator 4, since the driving units 12a, 12b (driving electrodes 18a, 18b) play not only a role of moving the carrier stage 11 but also a role of holding (supporting) the carrier stage 11, no holding unit is required. And therefore, the number of components can be reduced.

And, in the actuator 4, the plurality of driving units 12a, 12b is provided in the X-axis direction (one direction of the biaxial directions). And therefore, with the plurality of driving units (for example, the first driving unit 12a and the second driving unit 12b) being provided in uniaxial direction (for example, the X-axis direction), the actuator 4 can be stably operated. The operation of this actuator 4 is described below using FIGS. 20A and 20B.

A reference symbol Vp1 in FIG. 20A denotes a signal causing the first piezoelectric element 17a to extend and contract, a reference symbol Vd1 denotes a control signal applied to the first driving electrode 18a, and a reference symbol Vp2 denotes a signal causing the second piezoelectric element 17b to extend and contract, and a reference symbol Vd2 denotes a control signal applied to the second driving electrode 18b. And, a reference symbol Vs in FIG. 20B denotes a control signal applied to the carrier electrode 15. The carrier stage 11 has three types of operation mode, that is, Forward mode (forward operation), Back mode (backward operation), and Stop mode (stop operation). As shown in FIG. 20B, corresponding to the operation mode of the carrier stage 11, the timing chart of the control signal applied to the signal Vs is different.

Here, the Forward mode of the actuator 4 is described. It is assumed that, in an initial stationary state, signals applied to all electrodes are zero (0V).

First, in STEP 1 which is a start of the operation of the actuator 4, LOW is inputted to the control signal Vs applied to the carrier stage 11, HIGH is inputted to the signal Vd1 applied to the first driving electrode 18a, and LOW is inputted to the signal Vd2 applied to the second driving electrode 18b, thereby providing a potential difference between the carrier stage 11 and the first driving electrode 18a. With electrostatic force, the carrier electrode 15 is adsorbed to the first driving electrode 18a.

In STEP 2, the signal Vp1 applied to the first piezoelectric element 17a is set to be a signal that causes the piezoelectric element 17a to make a transition from a contracting state to an extending state. The signal Vp2 applied to the second piezoelectric element 17b is set to be a signal that causes the piezoelectric element 17b to make a transition from a contracting state to an extending state. The extending or contracting operation of the first piezoelectric element 17a matches with that of the second piezoelectric element 17b, and in the case where these two piezoelectric elements 17a, 17b are disposed in uniaxial direction, they make an extending or contracting displacement so as to be closer to each other or away from each other. With the electrostriction of the piezoelectric elements 17a, 17b, the driving electrodes 18a, 18b are moved. At this time, since the carrier electrode 15 (carrier stage 11) is adsorbed only to the first driving electrode 18a, the carrier electrode 15 moves in a forward direction by an amount of electrostriction displacement of the first piezoelectric element 17a.

In STEP 3, LOW is applied to the first driving electrode 18a to release adsorption of the carrier electrode 15 (carrier stage) and the first driving electrode 18a. At the same time, HIGH is applied to the second driving electrode 18b to newly adsorb the carrier electrode 15 (carrier stage 11) and the second driving electrode 18b with electrostatic force.

In STEP 4, the signal Vp1 applied to the first piezoelectric element 17a is set to be a signal that causes the piezoelectric element 17a to make a transition from an extending state to a contracting state. The signal Vp2 applied to the second piezoelectric element 17b is set to be a signal that causes the piezoelectric element 17b to make a transition from an extending state to a contracting state. The extending or contracting operation of the first piezoelectric element 17a matches with that of the second piezoelectric element 17b, and in the case where these two piezoelectric elements 17a, 17b are disposed in uniaxial direction, they make an extending or contracting displacement so as to be closer to each other or away from each other. With the electrostriction of these piezoelectric elements 17a, 17b, the driving electrodes are moved to the state in STEP 1. At this time, the carrier electrode 15 (carrier stage 11) is still adsorbed to only the second driving electrode 18b. And therefore, even after the driving electrodes 18a and 18b return to the state of STEP 1 respectively, the carrier electrode 15 (carrier stage 11) is still adsorbed to the second driving electrode 18b.

STEP 1 to STEP 4 described above are a one-cycle operation of the actuator according to the fourth embodiment. The piezoelectric elements 17a, 17b and the driving electrodes 18a, 18b return to the initial positions in STEP 1 after one cycle respectively, but the carrier stage 11 moves in the forward direction by an amount of electrostriction of the first piezoelectric element 17a and an amount of electrostriction of the second piezoelectric element 17b after one cycle. By repeating this cycle, the carrier stage 11 successively moves in the forward direction.

The Stop mode in which the carrier stage 11 becomes stationary and the Back mode can be achieved by changing only the signal applied to the carrier electrode 15 as shown in FIG. 20B, without changing the control signals for the driving system shown in FIG. 20A.

As described above, in the case where two driving units 12a, 12b are provided in the X-axis direction, in STEP 2, since the carrier stage 11 is adsorbed to the driving electrodes 18a, 18b in the X-axis direction through the carrier electrode 15, driving force from both front and rear with respect to the forward direction, that is, the X-axis direction, can be ensured. And therefore, in the actuator 4, the carrier stage 11 can be stably moved with stable driving force.

And, in the case where the driving units 12a, 12b are provided in the X-axis direction, the carrier stage 11 moves with the first driving electrode 18a in STEP 2, whilst the carrier stage 11 moves with the second driving electrode 18b in STEP 4. And therefore, the actual operation speed is at least doubled compared with the speed of the actuator 101 studied by the inventors.

Fifth Embodiment

Figure 21:
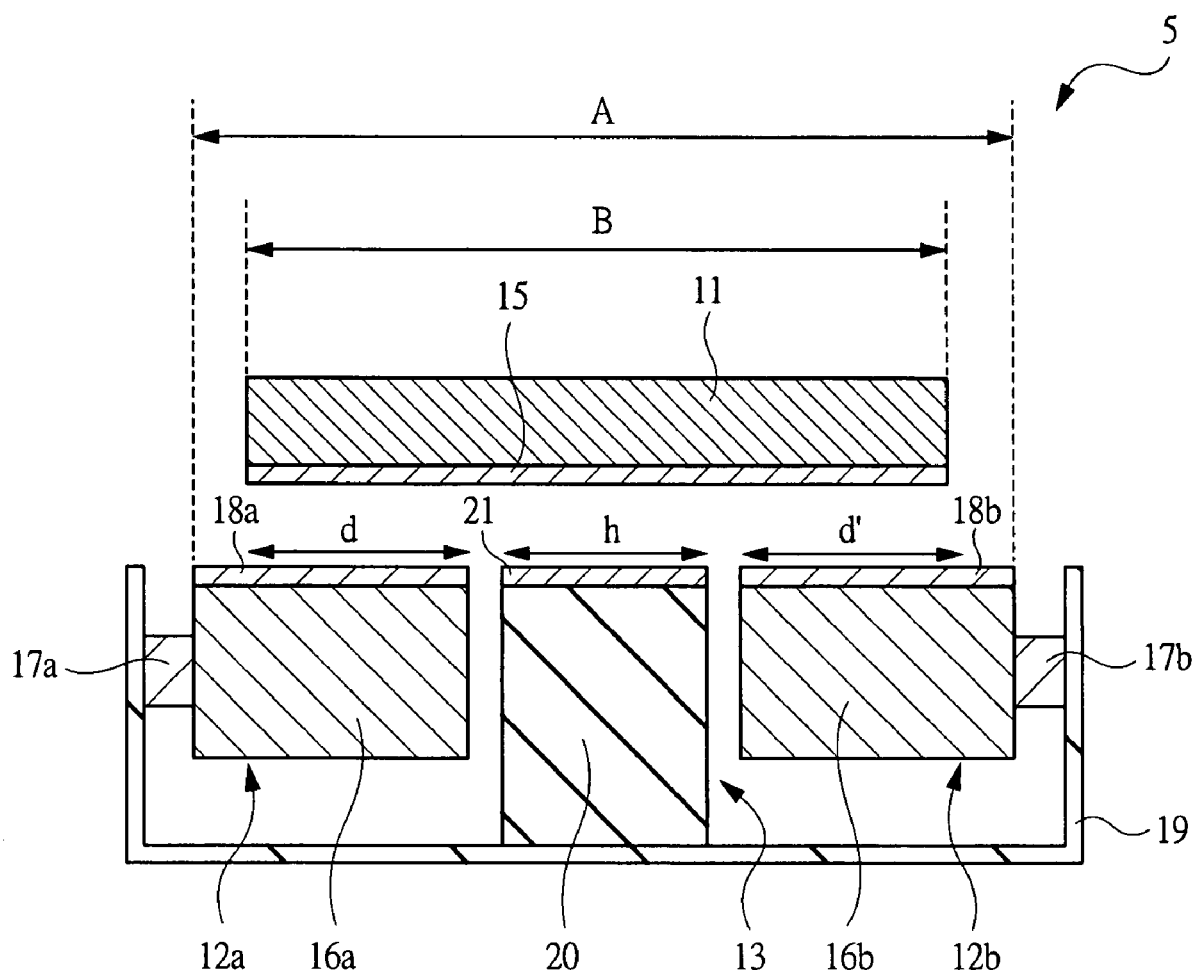
FIG. 21 is a cross-sectional diagram schematically showing a main part of an actuator according to a fifth embodiment of the present invention.

An actuator system of the piezoelectric driving-electrostatic adsorption type (hereinafter referred to as an actuator) according to a fifth embodiment of the present invention is described using FIG. 21. FIG. 21 is a cross-sectional diagram of a main part of the actuator according to the fifth embodiment of the present invention. Note that, in FIG. 21, for ease of description, a carrier stage 11 is shown as being separated from driving units 12a and 12b and a holding unit 13. In practice, however, the carrier stage 11 is provided so as to make contact with the driving units 12a and 12b and the holding unit 13.

As shown in FIG. 21, the actuator 5 according to the fifth embodiment includes the carrier stage 11 composed of a substrate moving in biaxial directions (X-Y axes directions), the first driving unit 12a and the second driving unit 12b provided to face the carrier stage 11 and moving the carrier stage 11 in uniaxial direction (an X-axis direction), and the holding unit 13 provided to face the carrier stage 11 and holding the carrier stage 11, and is a mechanism that drives the carrier stage 11 having a recording medium mounted thereon in the biaxial directions. The first driving unit 12a, the second driving unit 12b, and the holding unit 13 are provided in an arrangement in which the driving units 12a and 12b are provided on both sides of the holding unit 13 in the X-axis direction.

And, the carrier stage 11 has a carrier electrode 15 provided on a surface of the carrier stage 11 on a driving units 12a, 12b side. Furthermore, the driving units 12a and 12b include driving stages 16a and 16b respectively, as base materials (third substrate), and further include piezoelectric elements 17a and 17b provided on side surfaces of driving stages 16a and 16b, respectively, and expanding and contracting in the X-axis direction, and driving electrodes 18a and 18b provided on surfaces of the driving stages 16a and 16b on a carrier stage 11 side and electrostatically adsorbing the carrier electrode 15. The piezoelectric elements 17a and 17b are fixed to a supporting frame 19. And, the holding unit 13 includes a base frame 20 fixed to the supporting frame 19 as a base material, and also includes a holding electrode 21 provided on a surface of the base frame 20 on a carrier stage 11 side and electrostatically adsorbing the carrier electrode 15.

And, with an insulating film not shown being provided on a surface of the carrier electrode 15 on a driving electrodes 18a, 18b side, the driving electrodes 18a, 18b and the holding electrode 21 are electrically insulated from the carrier electrode 15.

Here, it is assumed that a width B of the carrier stage 11 is a dimension not exceeding a range from an end of the driving electrode 18a that is opposite to the holding electrode 21 to an end of the driving electrode 18b that is opposite to the holding electrode 21. It is also assumed that a maximum movement range A in which the carrier stage 11 can move is a range from the end of the driving electrode 18a that is opposite to the holding electrode 21 to the end of the driving electrode 18b that is opposite to the holding electrode 21. That is, in the actuator according to the fifth embodiment, a configuration in which the width B of the carrier stage 11 does not exceed the maximum movement range A of the carrier stage 11 is employed.

With the width B of the carrier stage 11 not exceeding the maximum movement range A, the carrier electrode 15 always faces a plurality of control electrodes, such as the first driving electrode 18a, the second driving electrode 18b, and the holding electrode 21. And therefore, an effective counter electrode area for generating adsorbability by electrostatic force exists.

Since FIG. 21 shows the cross-sectional diagram of the actuator 5, in order to show a dimension of the effective counter electrode area, a length of a cross-section of each of the control electrodes (the driving electrodes 18a and 18b and the holding electrode 21) is used by way of experiment. In the fifth embodiment, it is assumed that the first electrode 18a, the second driving electrodes 18b and the holding electrode 21 occupy the same distance in a vertical direction with respect to the sheet, and an arrangement of the electrodes are determined so that lengths d, d' and h of effective cross-sections of the control electrodes facing the carrier stage 11 in FIG. 21 satisfy following relation.

$$h = d + d' \tag{1}$$

If a relation of the equation (1) holds and, furthermore, the maximum movement range A of the carrier stage 11 in the actuator 5 is within a range from an end of the driving electrode 18a that is opposite to the holding electrode 21 to an end of the driving electrode 18b that is opposite to the holding electrode 21, a total of adsorbability of the first driving electrode 18a and the second driving electrode 18b is equal to adsorbability of the holding electrode 21, wherever the carrier stage 11 is located in an area where the carrier stage 11 can move within the actuator 5. That is, in the actuator according to the fifth embodiment, stable electrostatic adsorbability can be provided without adjusting strength of the signals applied to the driving electrodes 18a and 18b and the holding electrode 21 which are control electrodes according to the location of the carrier stage 11. Furthermore, in the actuator according to the fifth embodiment, since the maximum movement range A of the carrier stage 11 is defined, a situation such that the location of the carrier stage 11 significantly deviates to a side of one of the first driving electrode 18a and the second driving electrode 18b and the carrier stage 11 cannot return to the initial position can be avoided.

And, in the actuator 5, the plurality of driving units 12a and 12b are provided in the X-axis direction (one of the biaxial directions). And therefore, by providing the plurality of driving units (for example, the first driving unit 12a and the second driving unit 12b) in uniaxial direction (for example, the X-axis direction), the actuator 5 can be stably operated. Furthermore, the driving units 12a and 12b are provided on both sides of the holding unit 13 in the X-axis direction. And therefore, the actuator 5 can be more stably operated.

Sixth Embodiment

In the fifth embodiment, the case in which the actuator system of the piezoelectric driving-electrostatic adsorption type includes a holding unit provided with a holding electrode in the mechanism of driving the carrier stage in the X-Y axes directions has been described. In a sixth embodiment, a case in which a holding unit is not included is described.

Figure 22:
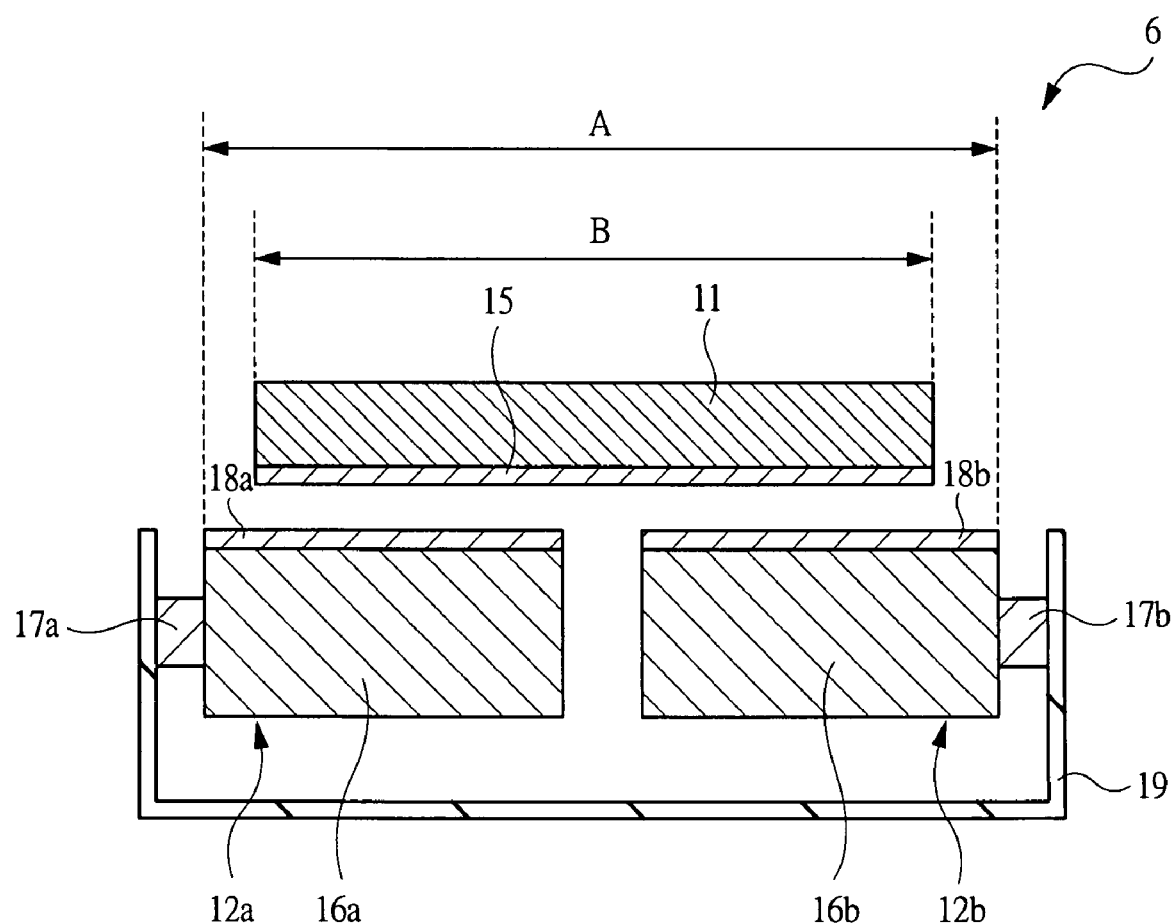
FIG. 22 is a cross-sectional diagram schematically showing a main part of an actuator according to a sixth embodiment of the present invention.
Figure 23A:
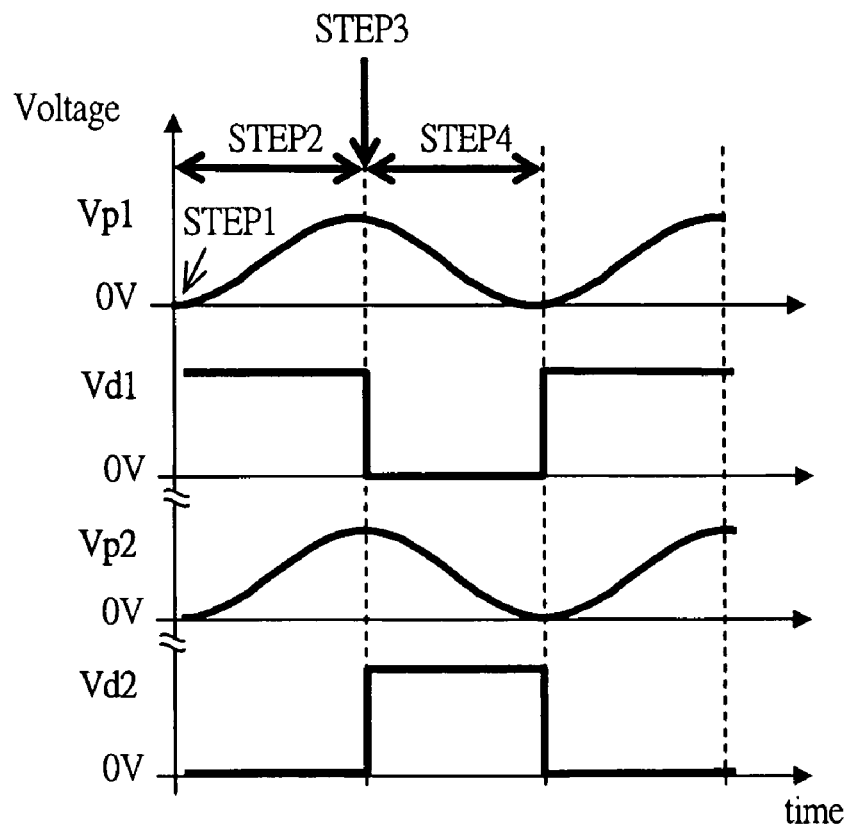
FIG. 23A is a timing chart of control signals for a driving system for moving a carrier stage in the actuator according to the sixth embodiment of the present invention.
Figure 23B:
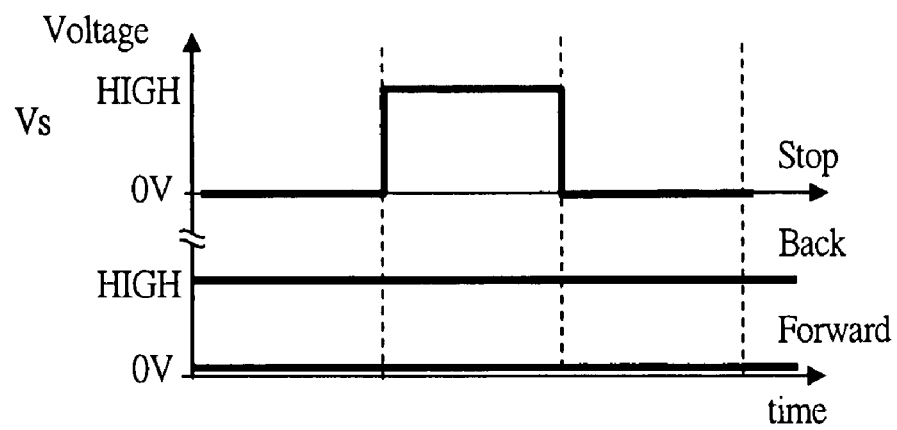
FIG. 23B is a timing chart of a control signal for a carrying system for moving the carrier stage in the actuator according to the sixth embodiment of the present invention.

An actuator system of the piezoelectric driving-electrostatic absorption type (hereinafter referred to as an actuator) according to the sixth embodiment of the present invention is described using FIGS. 22 to 23B. FIG. 22 is a cross-sectional diagram of a main part of the actuator according to the sixth embodiment of the present invention. FIGS. 23A and 23B are timing charts of control signals of the actuator of FIG. 22. FIG. 23A shows control signals for a driving system, whilst FIG. 23B shows a control signal for a carrying system. Note that, in FIG. 22, for ease of description, the carrier stage 11 is shown as being separated from driving units 12a and 12b. In practice, however, the carrier stage 11 is provided so as to make contact with the driving units 12a and 12b.

As shown in FIG. 22, the actuator 6 according to the sixth embodiment includes the carrier stage 11 composed of a substrate moving in the biaxial directions (X-Y axis directions) and the first driving unit 12a and the second driving unit 12b provided to face the carrier stage 11 and moving the carrier stage 11 in uniaxial direction (the X-axis direction), and is a mechanism that drives the carrier stage 11 in the biaxial directions.

And, the carrier stage 11 has a carrier electrode 15 provided on a surface of the carrier stage 11 on a driving units 12a, 12b side. Furthermore, the driving units 12a and 12b include driving stages 16a and 16b, respectively, as base materials, and further include piezoelectric elements 17a and 17b provided on side surfaces of driving stages 16a and 16b, respectively and expanding and contracting in the X-axis direction, and driving electrodes 18a and 18b provided on surfaces of the driving stages 16a and 16b respectively on a carrier stage 11 side and electrostatically adsorbing the carrier electrode 15. The piezoelectric elements 17a and 17b are fixed to a supporting frame 19.

Also, with an insulating film not shown being provided on a surface of the carrier electrode 15 on a driving electrodes 18a, 18b side, the driving electrodes 18a and 18b are electrically insulated from the carrier electrode 15 respectively.

Here, a width B of the carrier stage 11 is set to a dimension not exceeding a range from an end of the driving electrode 18a on a piezoelectric element 17a side to an end of the driving electrode 18b on a piezoelectric element 17b side. And a maximum movement range A in which the carrier stage 11 can move is set to a range from the end of the driving electrode 18a on the piezoelectric element 17a side to the end of the driving electrode 18b on the piezoelectric element 17b side. That is, in the actuator according to the sixth embodiment, a configuration in which the width B of the carrier stage 11 does not exceed the maximum movement range A of the carrier stage 11 is employed.

As described above, in the actuator 6, since the driving units 12a and 12b (driving electrodes 18a and 18b) play not only a role of moving the carrier stage 11 but also a role of holding (supporting) the carrier stage 11, no holding unit is required. And therefore, the number of components can be reduced.

And, in the actuator 6, the plurality of driving units 12a and 12b are provided in the X-axis direction (one axial direction of the biaxial directions). And therefore, by providing the plurality of driving units (for example, the first driving unit 12a and the second driving unit 12b) in uniaxial direction (for example, the X-axis direction), the actuator 6 can be stably operated. The operation of this actuator 6 is described below using FIGS. 23A and 23B.

A reference symbol Vp1 in FIG. 23A denotes a signal causing the first piezoelectric element 17a to extend and contract, a reference symbol Vd1 denotes a control signal applied to the first driving electrode 18a, a reference symbol Vp2 denotes a signal causing the second piezoelectric element 17b to extend and contract, and a reference symbol Vd2 denotes a control signal applied to the second driving electrode 18b. And, a reference symbol Vs in FIG. 23B denotes a control signal applied to a carrier electrode 15 on the carrier stage 11 disposed at a position facing the first driving electrode 18a and the second driving electrode 18b. The carrier stage 11 has three types of operation mode, that is, Forward mode (forward operation), Back mode (backward operation), and Stop mode (stop operation). As shown in FIG. 23B, corresponding to the operation mode of the carrier stage 11, a timing chart of the control signal Vs applied to the carrier electrode 15 is different.

Here, the Forward mode of the actuator 6 is described. It is assumed that, in an initial stationary state, signals applied to all electrodes are zero (0V).

First, in STEP 1 which is a start of the operation of the actuator 6, LOW is inputted to the control signal Vs applied to the carrier stage 11, HIGH is inputted to the signal Vd1 applied to the first driving electrode 18a, and LOW is inputted to the signal Vd2 applied to the second driving electrode 18b, thereby providing a potential difference between the carrier electrode 15 and the first driving electrode 18a. With electrostatic force, the carrier stage 11 is adsorbed only to the first driving electrode 18a.

Next, in STEP 2, the signal Vp1 applied to the first piezoelectric element 17a is set to a signal that causes the piezoelectric element 17a to make a transition from a contracting state to an extending state. The signal Vp2 applied to the second piezoelectric element 17b is set to a signal that causes the piezoelectric element 17b to make a transition from a contracting state to an extending state. The extending or contracting operation of the first piezoelectric element 17a matches with that of the second piezoelectric element 17b. In the case where these two piezoelectric elements 17a and 17b are disposed in uniaxial direction, they make an extending or contracting displacement so as to be closer to each other or away from each other. With electrostriction of the first and second piezoelectric elements 17a and 17b described above, the driving electrodes 18a and 18b are moved respectively. At this time, since the carrier electrode 15 is adsorbed only to the first driving electrode 18a, the carrier electrode 15 moves in a forward direction by an amount of the electrostriction displacement of the first piezoelectric element 17a.

Then, in STEP 3, LOW is applied to the first driving electrode 18a to release adsorption of the carrier electrode 15 (carrier stage 11) and the first driving electrode 18a. At the same time, HIGH is applied to the second driving electrode 18b to newly adsorb the carrier electrode 15 (carrier stage 11) and the second driving electrode 18b with electrostatic force.

Next, in STEP 4, the signal Vp1 applied to the first piezoelectric element 17a is set to a signal that causes the piezoelectric element 17a to make a transition from an extending state to a contracting state. The signal Vp2 applied to the second piezoelectric element 17b is set to a signal that causes the piezoelectric element 17b to make a transition from an extending state to a contracting state. The extending or contracting operation of the first piezoelectric element 17a matches with that of the second piezoelectric element 17b. In the case where these two piezoelectric elements 17a and 17b are disposed in one axial direction, they make an extending or contracting displacement so as to be closer to each other or away from each other. With electrostriction of the first piezoelectric element 17a and the second piezoelectric element 17b described above, the first driving electrode 18a and the second driving electrode 18b are moved to the state in STEP 1. At this time, the carrier electrode 15 is still adsorbed only to the second driving electrode 18b. And therefore, even after each of the driving electrodes 18a and 18b is back to the state of STEP 1, the carrier electrode 15 is still adsorbed to the second driving electrode 18b.

STEP 1 to STEP 4 described above are a one-cycle operation of the actuator according to the sixth embodiment. The piezoelectric elements 17a and 17b and the driving electrodes 18a and 18b return to the initial positions in STEP 1 after one cycle respectively, but the carrier stage 11 moves in the forward direction by an amount of electrostriction of the piezoelectric element 17a and an amount of electrostriction of the piezoelectric element 17b after one cycle. By repeating this cycle, the carrier stage 11 successively moves in the forward direction.

And, the Stop mode in which the carrier stage 11 becomes stationary and the Back mode can be achieved by changing only the signal applied to the carrier electrode 15 as shown in FIG. 23B, without changing the control signals for the driving system shown in FIG. 23A.

As described above, in the actuator according to the sixth embodiment, since the maximum movement range A of the carrier stage 11 is defined, a situation such that the location of the carrier stage 11 significantly deviates to a side of one of the first driving electrode 18a and the second driving electrode 18b and the carrier stage 11 cannot return to the initial position can be avoided.

And, in the case where two driving units 12a and 12b are provided in the X-axis direction, in STEP 2, since the carrier stage 11 is adsorbed to the driving electrodes 18a and 18b in the X-axis direction via the carrier electrode 15, driving force from both front and rear with respect to the forward direction, that is, the X-axis direction, can be ensured. And therefore, in the actuator 6, the carrier stage 11 can be moved with stable driving force.

And, in the case where two driving units 12a and 12b are provided in the X-axis direction, the carrier stage 11 moves with the first driving electrode 18a in STEP 2, whilst the carrier stage 11 moves with the second driving electrode 18b in STEP 4. And therefore, the actual operation speed is at least doubled compared with speed of the actuator 101 studied by the present inventors.

Seventh Embodiment

In the fifth embodiment, the configuration of the actuator system of the piezoelectric driving-electrostatic adsorption type including two driving electrodes and one holding electrode as control electrodes has been described. In a seventh embodiment of the present invention, a configuration of an actuator system of the piezoelectric driving-electrostatic absorption type in which one driving electrode and two holding electrodes are provided as control electrodes is described.

Figures 24, 25:
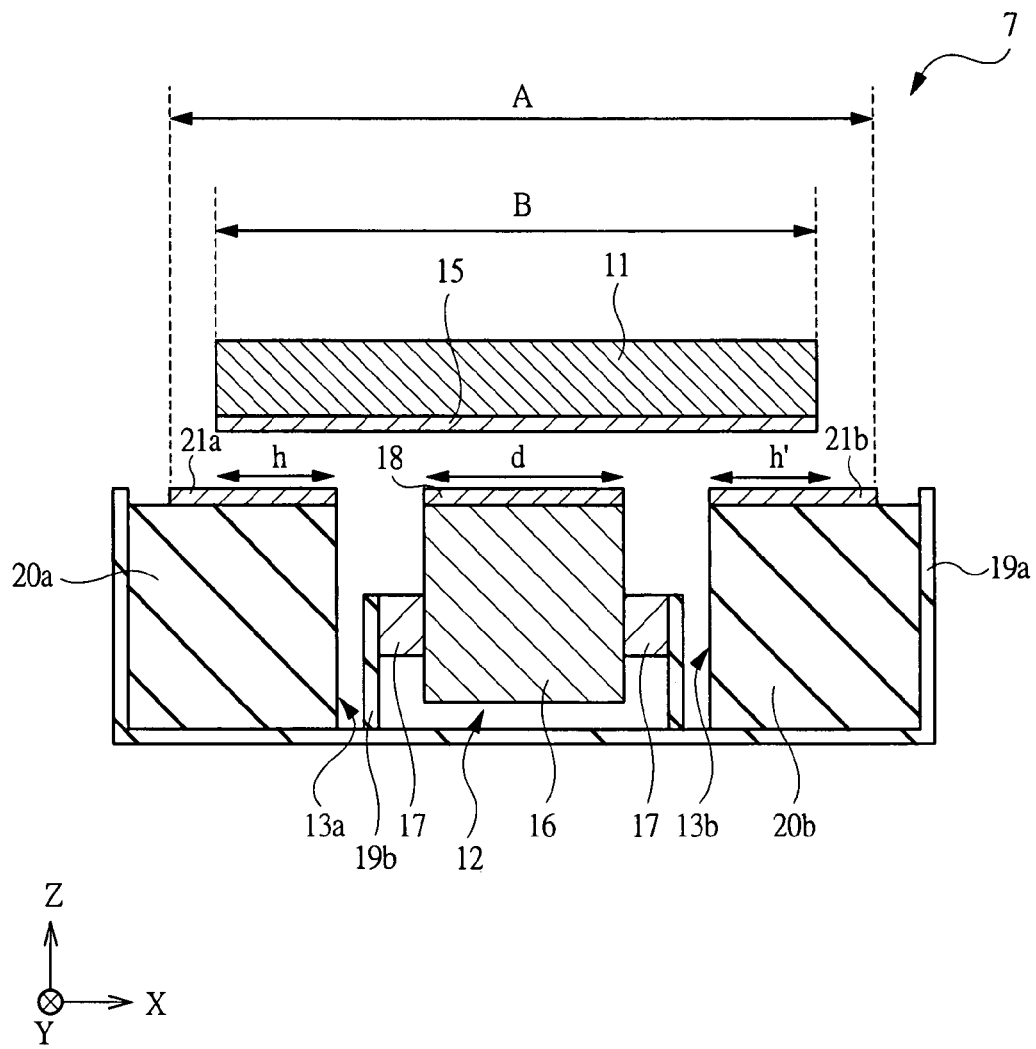
FIG. 24 is a cross-sectional diagram schematically showing a main part of an actuator according to a seventh embodiment of the present invention.
FIG. 25 is a table showing standard performance of each element forming a probe memory required for achieving a recording surface density of a recording medium of 1 Tb/inch$^2$ or higher.
Figure 27:
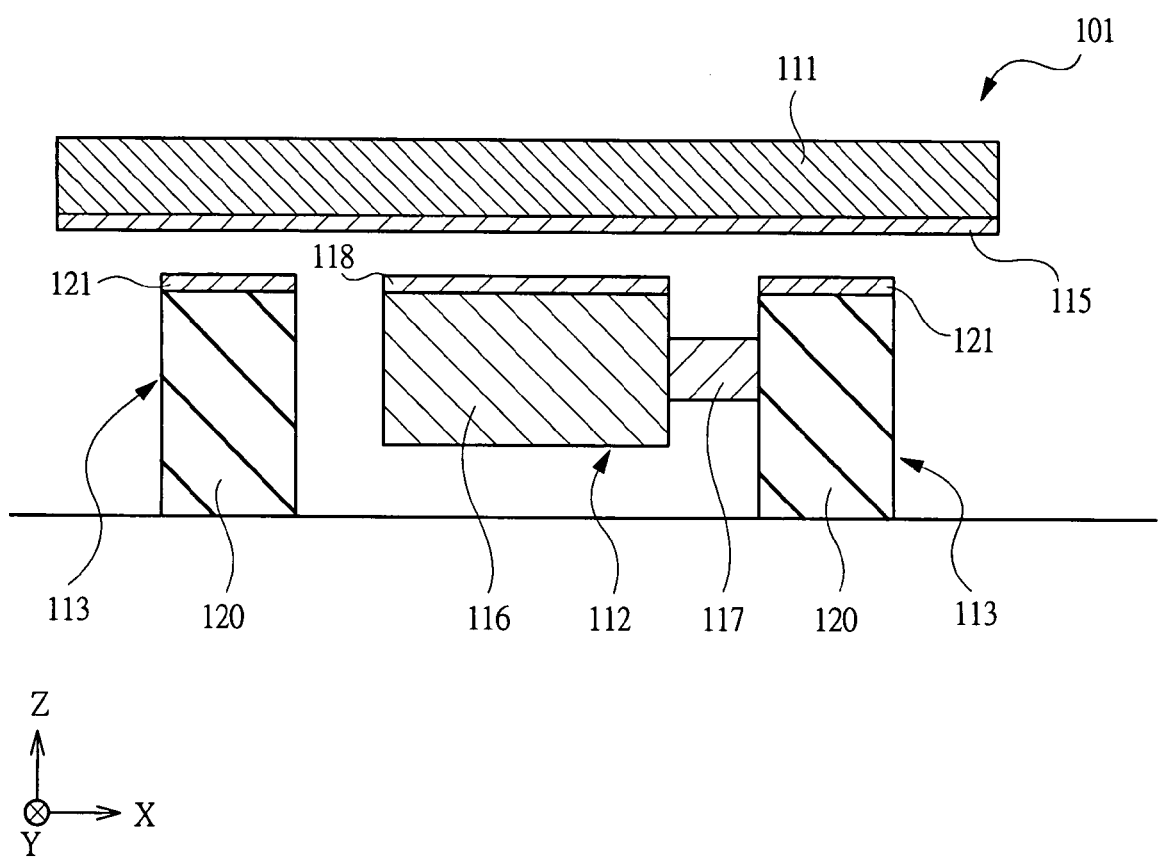
FIG. 27 is a cross-sectional diagram schematically showing a main part of an actuator studied by the present inventors.
Figure 28A:
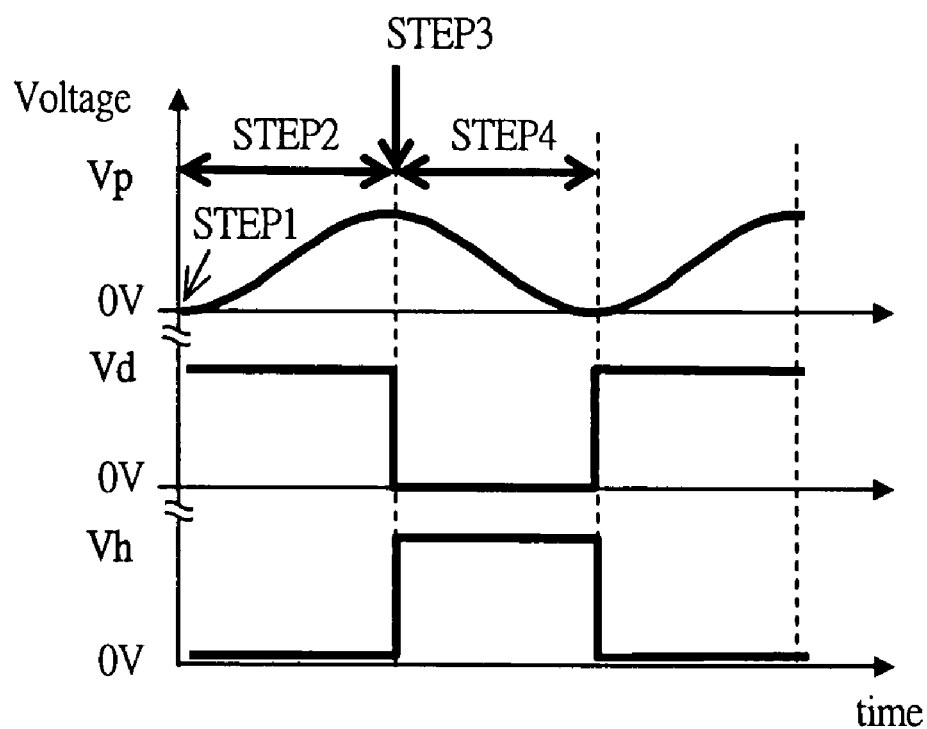
FIG. 28A is a timing chart of control signals for a driving system for moving a carrier stage in an actuator studied by the inventors.
Figure 28B:
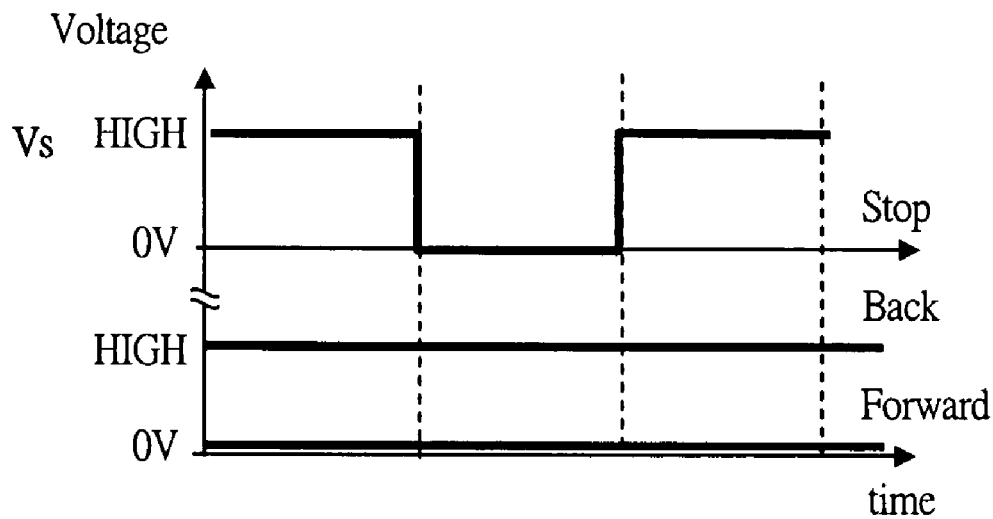
FIG. 28B is a timing chart of a control signal for a carrying system for moving the carrier stage in the actuator studied by the inventors.

The actuator system of the piezoelectric driving-electrostatic adsorption type (hereinafter referred to as an actuator) according to the seventh embodiment of the present invention is described using FIG. 24. FIG. 24 is a cross-sectional diagram of a main part of the actuator according to the seventh embodiment of the present invention. Note that, in FIG. 24, for ease of description, a carrier stage 11 is shown as being separated from a driving unit 12 and holding units 13a and 13b. In practice, however, the carrier stage 11 is provided so as to make contact with the driving unit 12 and the holding units 13a and 13b.

As shown in FIG. 24, the actuator 7 according to the seventh embodiment includes the carrier stage 11 composed of a substrate moving in the biaxial directions (X-Y axes directions), the driving unit 12 provided to face the carrier stage 11 and moving the carrier stage 11 in uniaxial direction (the X-axis direction), and a first holding unit 13a and a second holding unit 13b provided to face the carrier stage 11 and holding the carrier stage 11, and is a mechanism that drives the carrier stage 11 having a recording medium mounted thereon in the biaxial directions. The driving unit 12, the first holding unit 13a and the second holding unit 13b are provided in an arrangement in which the holding units 13a and 13b are provided on both sides of the driving unit 12 in the X-axis direction.

And, the carrier stage 11 has a carrier electrode 15 provided on a surface of the carrier stage 11 on a driving unit 12 side. Furthermore, the driving unit 12 includes a driving stage 16 as a base material (third substrate), and further includes piezoelectric elements 17 provided on both side surfaces of the driving stage 16 and expanding and contracting in the X-axis direction, and a driving electrode 18 provided on surface of the driving stage 16 on a carrier stage 11 side and electrostatically adsorbing the carrier electrode 15. The piezoelectric elements 17 are fixed to a supporting frame 19b. And, the holding units 13a and 13b include base frames 20a and 20b fixed to a supporting frame 19a as base materials, and also include holding electrodes 21a and 21b provided on surfaces of the base frames 20a and 20b respectively on a carrier stage 11 side and electrostatically adsorbing the carrier electrode 15.

And, with an insulating film not shown being provided on a surface of the carrier electrode 15 on a driving electrode 18 side, the driving electrode 18, the holding electrodes 21a and 21b, are electrically insulated from the carrier electrode 15.

Here, a width B of the carrier stage 11 is set to a dimension not exceeding a range from an end of the holding electrode 21a that is opposite to the driving electrode 18 to an end of the holding electrode 21b that is opposite to the driving electrode 18. And, a maximum movement range A in which the carrier stage 11 can be operated is set to a range from the end of the holding electrode 21a that is opposite to the driving electrode 18 to the end of the holding electrode 21b that is opposite to the driving electrode 18. That is, in the actuator 7, a configuration in which the width B of the carrier stage 11 does not exceed the maximum movement range A of the carrier stage 11 is employed.

By setting the width B of the carrier stage 11 not to exceed the maximum movement range A, the carrier electrode 15 always faces a plurality of control electrodes, such as the first holding electrode 21a, the second holding electrode 21b, and the driving electrode 18. And therefore, an effective counter electrode area for generating adsorbability by electrostatic force exists.

Since FIG. 24 shows the cross-sectional diagram of the actuator, in order to show a dimension of effective counter electrode area, a length of a cross-section of each of the control electrodes (the driving electrode 18 and the holding electrodes 21a and 21b) is used by way of experiment. In the seventh embodiment, it is assumed that the first holding electrode 21a, the second holding electrode 21b and the driving electrode 18 each occupy the same distance in a vertical direction with respect to the sheet, and an arrangement of the electrodes are determined so that lengths h, h' and d of effective cross-sections of the control electrodes facing the carrier stage 11 in FIG. 24 satisfy following relation.

$$d=h+h' \quad (2)$$

In the case where a relation of the equation 2 holds and, furthermore, the maximum movement range A of the carrier stage 11 in the actuator 7 is set to a range from the end of the holding electrode 21a that is opposite to the driving electrode 18 to the end of the holding electrode 21b that is opposite to the driving electrode 18, a total of adsorbability of the first holding electrode 21a and the second holding electrode 21b is equal to adsorbability of the driving electrode 18, wherever the carrier stage 11 is located in the movable area in the actuator 7. That is, when the driving unit 12 having the driving electrode 18 moves after carrying the carrier stage 11, adsorbability by the holding electrodes 21a and 21b has to be ensured so as not to move the carrier stage 11 by friction with the carrier stage 11.

And therefore, in the actuator 7, stable electrostatic adsorbability can be provided without adjusting strength of the signals applied to the holding electrodes 21a and 21b, and the driving electrode 18 which are control electrodes according to the location of the carrier stage 11.

And, in the actuator 7, since the maximum movement range A of the carrier stage 11 is defined, a situation such that the location of the carrier stage 11 significantly deviates to a side of one of the first holding electrode 21a and the second holding electrode and the carrier stage 11 cannot return to the initial position can be avoided.

And, the holding units 13a and 13b are provided on both sides of the driving unit 12 in the X-axis direction. And therefore, the carrier electrode 15 of the carrier stage 11 and the driving electrode 18 of the driving unit 12 can ensure certain adsorption force at the operation, thereby stably operating the actuator 7.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be widely used for an information recording device manufactured using a semiconductor technology or a semiconductor device.

What is claimed is:

1. An actuator system comprising:
   a substrate moving in biaxial directions;
   a driving unit provided to face the substrate and moving the substrate in one axial direction of the biaxial directions;
   a holding unit provided to face the substrate and holding the substrate;
   a piezoelectric element provided to the driving unit and expanding and contracting in the one axial direction;
   a first electrode provided on a surface of the substrate on a driving-unit side;
   a second electrode provided on a surface of the driving unit on a substrate side and electrostatically adsorbing the first electrode; and
   a third electrode provided on a surface of the holding unit on a substrate side and electrostatically adsorbing the first electrode,
   wherein the driving unit is provided plurally in number and disposed in the one axial direction.

2. The actuator system according to claim 1,
   wherein a movement range of the substrate is within an area formed by the driving unit provided plurally in number.

3. The actuator system according to claim 1,
   wherein the driving unit provided plurally in number is disposed on both sides of the holding unit in the one axial direction.

4. An actuator system comprising:
   a substrate moving in biaxial directions;
   a driving unit provided to face the substrate and moving the substrate in one axial direction of the biaxial directions;
   a piezoelectric element provided to the driving unit and expanding and contracting in the one axial direction;
   a first electrode provided on a surface of the substrate on a driving-unit side; and
   a second electrode provided on a surface of the driving unit on a substrate side and electrostatically adsorbing the first electrode,
   wherein the driving unit is provided plurally in number and disposed in the one axial direction.

5. The actuator system according to claim 4,
   wherein a movement range of the substrate is within an area formed by the driving unit provided plurally in number.

6. The actuator system according to claim 4,
   wherein signals for expanding and contracting the piezoelectric element of the driving unit provided plurally in number and disposed in the one axial direction are signals not synchronized with each other.

7. An actuator system comprising:
   a substrate moving in biaxial directions;
   a driving unit provided to face the substrate and moving the substrate in one axial direction of the biaxial directions;
   a holding unit provided to face the substrate and holding the substrate;
   a piezoelectric element provided to the driving unit and expanding and contracting in the one axial direction;
   a first electrode provided on a surface of the substrate on a driving-unit side;
   a second electrode provided on a surface of the driving unit on a substrate side and electrostatically adsorbing the first electrode; and
   a third electrode provided on a surface of the holding unit on a substrate side and electrostatically adsorbing the first electrode,
   wherein the piezoelectric element is provided plurally in number and disposed in the one axial direction, and
   wherein the piezoelectric element provided plurally in number is disposed on both sides of the driving unit in the one axial direction.

8. The actuator system according to claim 7,
   wherein the holding unit is provided plurally in number and disposed in the one axial direction, and
   wherein the holding unit provided plurally in number is disposed on both sides of the driving unit in the one axial direction.

* * * * *